United States Patent
Park et al.

(10) Patent No.: US 11,669,944 B2
(45) Date of Patent: Jun. 6, 2023

(54) ELECTRONIC DEVICE FOR VIDEO EDITING WITH DYNAMIC TONE METADATA AND OPERATION METHOD THEREOF

(71) Applicant: Samsung Electronics Co., Ltd., Suwon-si (KR)

(72) Inventors: Chansik Park, Suwon-si (KR); Yongchul Kim, Suwon-si (KR); Jungik Seo, Suwon-si (KR); Jaehun Cho, Suwon-si (KR); Hyunsoo Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 17/106,973

(22) Filed: Nov. 30, 2020

(65) Prior Publication Data

US 2021/0201455 A1 Jul. 1, 2021

(30) Foreign Application Priority Data

Dec. 27, 2019 (KR) ........................ 10-2019-0176520

(51) Int. Cl.
*G06T 5/00* (2006.01)
*G06T 5/50* (2006.01)
(Continued)

(52) U.S. Cl.
CPC ................ *G06T 5/009* (2013.01); *G06T 5/50* (2013.01); *H04N 9/646* (2013.01); *H04N 9/73* (2013.01); *G06T 2207/20208* (2013.01)

(58) Field of Classification Search
CPC . G06T 2207/10016; G06T 2207/20208; G06T 5/009; G06T 5/007; G06T 5/50
See application file for complete search history.

(56) References Cited

U.S. PATENT DOCUMENTS 8,737,738 B2 5/2014 Wang et al.
9,509,940 B2 11/2016 Matsui et al.
(Continued)

FOREIGN PATENT DOCUMENTS

JP 2008-244820 A 10/2008
KR 10-2019-0107217 A 9/2019

OTHER PUBLICATIONS

International Search Report dated Mar. 2, 2021, issued in International Application No. PCT/KR2020/017674.
(Continued)

*Primary Examiner* — Li Liu
(74) *Attorney, Agent, or Firm* — Jefferson IP Law, LLP

(57) ABSTRACT

An apparatus and method for editing an image including dynamic tone metadata in an electronic device are provided. The electronic device includes a display, and at least one processor operatively connected to the display, wherein the at least one processor may be configured to generate a third image to be inserted between a first image and a second image continuous with the first image among a plurality of images belonging to video content, generate dynamic tone metadata of the third image based on dynamic tone metadata of the first image and the second image, and update the video content by adding the third image and the dynamic tone metadata of the third image.

8 Claims, 25 Drawing Sheets

(51) Int. Cl.
  *H04N 9/73*  (2023.01)
  *H04N 9/64*  (2023.01)

(56) References Cited

U.S. PATENT DOCUMENTS

| | | | |
|---|---|---|---|
| 9,554,020 B2 * | 1/2017 | Thurston, III | ........... H04N 9/69 |
| 10,194,127 B2 | 1/2019 | Atkins | |
| 11,019,302 B2 * | 5/2021 | Pytlarz | ................. H04N 19/117 |
| 2012/0321273 A1 * | 12/2012 | Messmer | ............. H04N 9/8205 |
| | | | 386/E5.028 |
| 2014/0176745 A1 | 6/2014 | Pajak et al. | |
| 2016/0182911 A1 | 6/2016 | Su et al. | |
| 2017/0125063 A1 * | 5/2017 | Atkins | ................... G11B 27/28 |
| 2018/0132009 A1 | 5/2018 | Ivanovic | |
| 2019/0279549 A1 | 9/2019 | Shin et al. | |
| 2019/0313072 A1 * | 10/2019 | Kim | ......................... H04N 9/68 |
| 2019/0378253 A1 | 12/2019 | Huang | |

OTHER PUBLICATIONS

Extended European Search Report dated Sep. 20, 2022, issued in European Patent Application No. 20904583.0.

* cited by examiner

ELECTRONIC DEVICE FOR VIDEO EDITING WITH DYNAMIC TONE METADATA AND OPERATION METHOD THEREOF

CROSS-REFERENCE TO RELATED APPLICATION(S)

This application is based on and claims priority under 35 U.S.C. § 119(a) of a Korean patent application number 10-2019-0176520, filed on Dec. 27, 2019, in the Korean Intellectual Property Office, the disclosure of which is incorporated by reference herein in its entirety.

BACKGROUND

1. Field

The disclosure relates to an apparatus and method for editing a video including dynamic tone metadata in an electronic device.

2. Description of Related Art

The dynamic range (DR) of an image may be defined as a ratio between the brightest pixel value and the darkest pixel value in the image. The human eye can perceive a relatively higher dynamic range than the camera sensor or display of a regular electronic device. Such an electronic device may be unable to obtain or represent an image of a dynamic range perceived by a human as it is. For example, when capturing an image of a scene in which a high-illuminance region (very bright region) and a low-illuminance region (very dark region) coexist, such as backlight photography, the electronic device may obtain an image in which information on the high-illuminance region or the low-illuminance region is omitted. In addition, the image obtained by the electronic device fails to represent colors or tones (or, brightness) perceived by humans.

To provide images of a quality required by the user, the electronic device may support a dynamic tone mapping technique capable of representing an image with a feeling similar to that of an image perceived by a human. For example, a dynamic tone mapping technique may be supported in high dynamic range (HDR) 10+ or Dolby Vision.

The above information is presented as background information only to assist with an understanding of the disclosure. No determination has been made, and no assertion is made, as to whether any of the above might be applicable as prior art with regard to the disclosure.

SUMMARY

A dynamic tone mapping technique may independently apply a tone mapping operation to each frame (or image) constituting video content, so that the user can relatively accurately recognize the production intention of the video content. The dynamic tone mapping technique may provide tone mapping information in the form of metadata (dynamic tone metadata) to naturally represent the tone of the video content created at a brightness of the mastering display (or monitor) (e.g., about 1000 to 10000 nit) on the display of an electronic device with a different brightness (e.g., about 300 to 500 nit) according to the intention of the video producer.

The electronic device may edit video content based on a video editing technique such as frame rate conversion (FRC) or video concatenation. For example, when applying an FRC editing technique, to correspond to the target frame rate, the electronic device may generate at least one new frame (or image) and insert it between frame n (or image n) and frame n+1 (or image n+1) of the video content.

However, the electronic device may not have a scheme for generating dynamic tone metadata corresponding to the new frame (or image) generated based on the FRC editing technique. When dynamic tone metadata corresponding to at least some frames (or images) of the video content to be reproduced does not exist, HDR processing corresponding to display characteristics (e.g., brightness) of the electronic device may be limited. In this case, when the electronic device reproduces the video content, the image quality may deteriorate or a sense of heterogeneity may occur.

Aspects of the disclosure are to address at least the above-mentioned problems and/or disadvantages and to provide at least the advantages described below. Accordingly, an aspect of the disclosure is to provide an apparatus and method for editing a video including dynamic tone metadata in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display device, and at least one processor operatively connected to the display device, wherein the at least one processor may be configured to generate a third image to be inserted between a first image and a second image continuous with the first image among a plurality of images belonging to video content, based on at least one of the first image or the second image, generate dynamic tone metadata of the third image based on dynamic tone metadata of the first image and dynamic tone metadata of the second image, and update the video content by adding the third image and the dynamic tone metadata of the third image.

In accordance with another aspect of the disclosure, an electronic device is provided. The electronic device includes a display, and at least one processor operatively connected to the display, wherein the at least one processor may be configured to generate first video content by extracting at least one image from one or more video contents, identify, in case that there is a first image not having dynamic tone metadata among at least one image included in the first video content, original video content including the first image among the one or more video contents, identify at least one image having dynamic tone metadata among a plurality of images included in the original video content, select an image that satisfies a specified condition in playback time from among the identified at least one image having dynamic tone metadata, and generate dynamic tone metadata of the first image based on dynamic tone metadata of the selected image.

In accordance with another aspect of the disclosure, an electronic device is provided. The electronic device includes a memory to store a plurality of images having dynamic tone metadata, a display, and at least one processor operatively connected to the memory and the display, wherein the at least one processor may be configured to update a first image among a plurality of images belonging to video content based on video editing, select a second image corresponding to the updated first image from among the plurality of images stored in the memory or a plurality of images stored in another electronic device, and set dynamic tone metadata of the updated first image by updating dynamic tone metadata of the updated first image based on dynamic tone metadata of the second image corresponding to the updated first image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
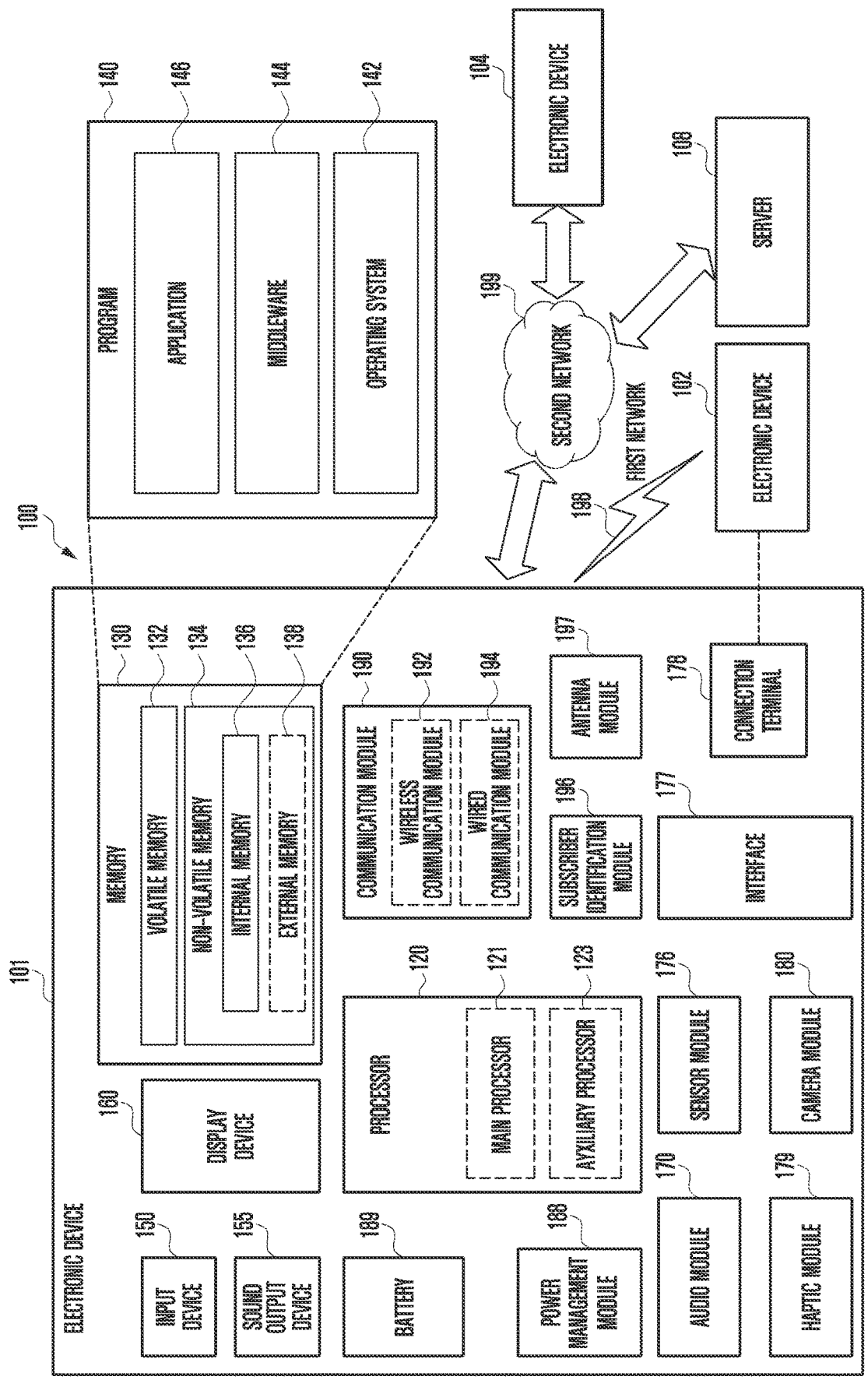
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. Non-volatile memory may include internal memory 136 and/or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
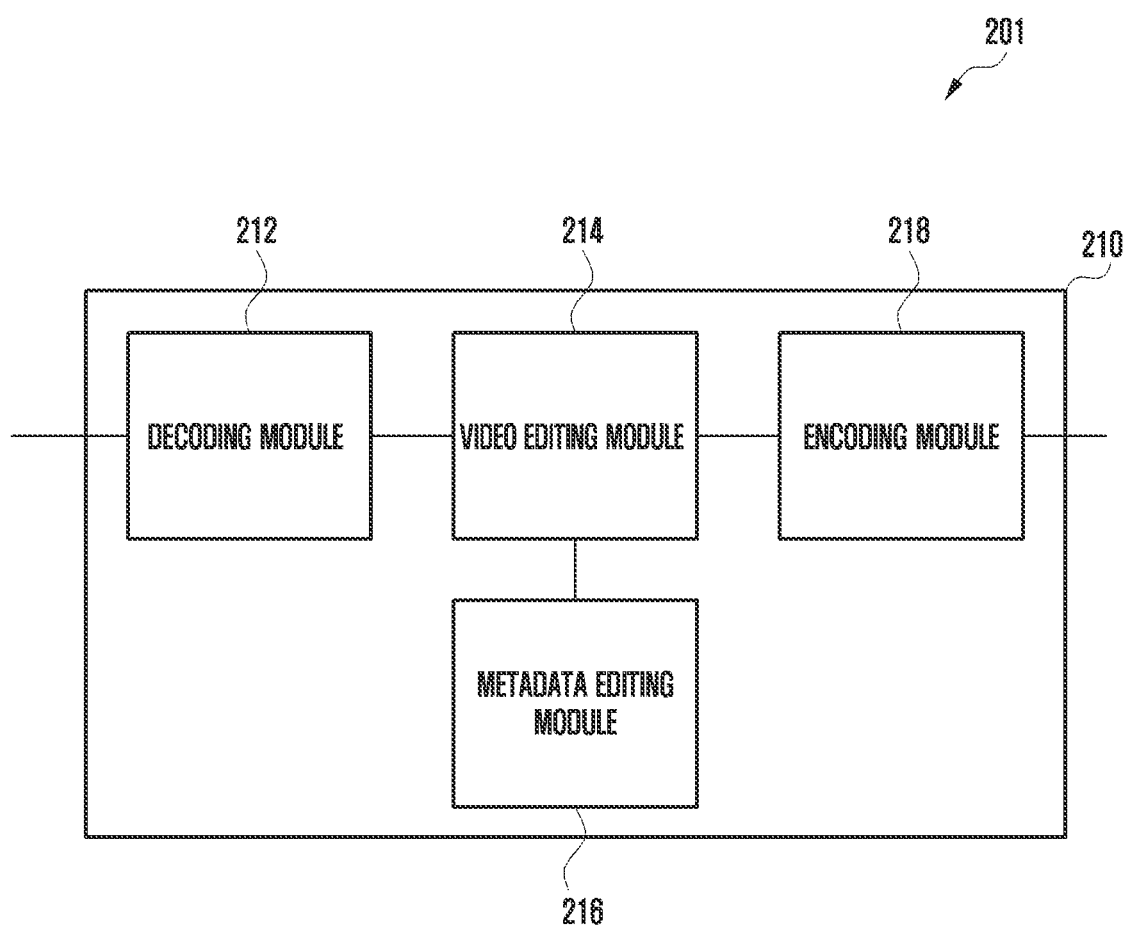
FIG. 2 is a block diagram of an electronic device for editing dynamic tone metadata according to an embodiment of the disclosure.

FIG. 2 is a block diagram of an electronic device for editing dynamic tone metadata according to an embodiment of the disclosure. For example, an electronic device 201 may correspond to the electronic device 101 in FIG. 1.

Referring to FIG. 2, a processor 210 of the electronic device 201 may include a decoding module 212, a video editing module 214, a metadata editing module 216, and an encoding module 218. In one embodiment, the processor 210 may be substantially the same as the processor 120 in FIG. 1 or may be included in the processor 120. For example, the processor 210 may include an application processor (AP), an image signal processor (ISP), or a display drive integrated circuit (DDI). For example, individual modules 212, 214, 216 and/or 218 included in the processor 210 may be implemented in software, and the processor 210 may load related instructions from the memory (e.g., memory 130 in FIG. 1) for execution.

In various embodiments, the decoding module 212 may decode encoded video content stored in the memory (e.g., memory 130 in FIG. 1). In one embodiment, the decoding module 212 may decode video content selected for editing among a plurality of encoded video content stored in the memory. For example, the video content may include a plurality of images consecutive in time. For example, an image included in the video content may correspond to a frame constituting the video content.

In various embodiments, the video editing module 214 may generate or edit at least one image related to the video content decoded by the decoding module 212. For example, video editing may include at least one of frame rate conversion (FRC), video concatenation, clipping, scaling (e.g., image enlargement or reduction), object (e.g., graphic data or text) insertion, or filtering.

In one embodiment, the video editing module 214 may generate at least one new image and insert it between images so as to correspond to a target frame rate based on an FRC editing technique (e.g., framerate up conversion). For example, a new image may be generated through interpolation based on at least one adjacent image included in the video content.

In one embodiment, the video editing module 214 may skip at least one image from consecutive images included in the video content so as to correspond to a target frame rate based on an FRC editing technique (e.g., framerate down conversion).

In one embodiment, the video editing module 214 may generate third video content by concatenating at least a portion of first video content and at least a portion of second video content based on a video concatenation editing technique.

In one embodiment, the video editing module 214 may adjust the size of at least one image included in the video content based on a scaling editing technique. For example, the video editing module 214 may increase or decrease the size of at least one image as a whole or at least some thereof.

In one embodiment, the video editing module 214 may insert graphic or text data into at least a region of at least one image included in the video content based on an object insertion editing technique.

In one embodiment, the video editing module 214 may generate fourth video content by extracting at least a portion of first video content based on a clip editing technique.

In various embodiments, the metadata editing module 216 may generate or edit dynamic tone metadata corresponding to at least one image based on the video content edited by the video editing module 214. For example, dynamic tone metadata may include information related to a tone (or brightness) for representing an image.

In one embodiment, when at least one image is created based on an FRC editing technique (e.g., framerate up conversion), the metadata editing module 216 may generate dynamic tone metadata of the new image based on dynamic tone metadata of at least one reference image. For example, the metadata editing module 216 may generate dynamic tone metadata of a new image based on an average of dynamic tone metadata of a plurality of reference images related to the new image. As another example, the metadata editing module 216 may generate dynamic tone metadata of a new image by applying a weight to dynamic tone metadata of the plurality of reference images related to the new image. Here, the weight may be determined based on at least one of a time interval between the new image and the reference image, a reference ratio between reference images related to generation of the new image, or a reference ratio between reference images related to encoding of the new image. As another example, the metadata editing module 216 may use dynamic tone metadata of an image matching the new image, among at least one image including dynamic tone metadata stored in the memory (e.g., memory 130 in FIG. 1) or the server (e.g., server 108 in FIG. 1), as dynamic tone metadata of the new image. Here, the at least one image including dynamic tone metadata stored in the memory or the server may include at least one image previously generated (or obtained) by the electronic device 201 and/or at least one image generated by an expert. As another example, the metadata editing module 216 may generate dynamic tone metadata of a new image by copying dynamic tone metadata of a reference image related to the new image from the video editing module 214.

In one embodiment, when at least one image is omitted from images by an FRC editing technique (e.g., framerate down conversion), the metadata editing module 216 may edit (or update) the dynamic tone metadata of the remaining images. For example, if the difference (or difference value) in dynamic tone metadata between images adjacent in playback time among the remaining images of the video content is greater than a threshold, the metadata editing module 216 may determine to edit the dynamic tone metadata of images. The metadata editing module 216 may update the dynamic tone metadata of the current image based on the dynamic tone metadata of the current image and/or at least one adjacent image. For example, the difference in dynamic tone metadata may include a difference between tone mapping curves representing tones (or brightness) corresponding to individual images.

In one embodiment, when third video content is generated based on a video concatenation editing technique, the metadata editing module 216 may generate or edit dynamic tone metadata of at least one image included in the third video content. For example, when there is no dynamic tone metadata associated with a first image included in the third video content, the metadata editing module 216 may generate dynamic tone metadata of the first image based on dynamic tone metadata of a second image included in the original video content (e.g., first video content or second video content). For instance, the dynamic tone metadata of the first image may be generated by copying the dynamic tone metadata of the second image. For instance, the first image may correspond to any image that does not have dynamic tone metadata in the third video content. For instance, the first image may correspond to an image at the start position of each original video content (e.g., first video content and/or second video content) within the third video content. For instance, the second image may correspond to an image closest to the first image in playback time among one or more images of the original video content having dynamic tone metadata and preceding the first image in playback time. For instance, the second image may correspond to an image closest to the first image in playback time among at least one image having dynamic tone metadata in the original video content. For example, if the difference in dynamic tone metadata between images at a time point when different pieces of video content are concatenated (e.g., boundary time point) exceeds a threshold value, the metadata editing module 216 may determine to edit the dynamic tone metadata of images. The metadata editing module 216 may update dynamic tone metadata of the current image based on dynamic tone metadata of at least one of the current image, at least one previous image, or at least one subsequent image. For instance, the image related to the boundary time point may correspond to at least one image disposed at a position where the first video content and the second video content are concatenated within the third video content generated based on a video concatenation editing technique.

In one embodiment, when at least one image included in the video content is edited based on a video editing technique (e.g., image enlargement, image reduction, or object insertion), the metadata editing module 216 may edit (or update) the dynamic tone metadata of the edited image. For example, the metadata editing module 216 may edit dynamic tone metadata of at least one image based on a video editing technique corresponding to editing of at least one image. As another example, the metadata editing module 216 may use dynamic tone metadata of an image matching the edited image, among at least one image including dynamic tone metadata and stored in the memory (e.g., memory 130 in FIG. 1) or the server (e.g., server 108 in FIG. 1), as dynamic tone metadata of the edited image. For instance, editing (or updating) the dynamic tone metadata of an edited image may be performed when the difference in dynamic tone metadata between the edited image in the video content and an image adjacent to the edited image in playback time exceeds a threshold value.

In one embodiment, when fourth video content is generated by a clip editing technique, the metadata editing module 216 may generate dynamic tone metadata of at least one image included in the fourth video content. For example, when there is no dynamic tone metadata for a first image included in the fourth video content, the metadata editing module 216 may generate dynamic tone metadata of the first image by copying the dynamic tone metadata of a second image included in the original video content (e.g., first video content). For instance, the second image may correspond to an image closest to the first image in playback time among one or more images of the original video content having dynamic tone metadata and preceding the first image in playback time. For instance, the second image may correspond to an image closest to the first image in playback time among at least one image having dynamic tone metadata in the original video content.

In various embodiments, the encoding module 218 may match image data edited (or generated) by the video editing module 214 with dynamic tone metadata edited (or generated) by the metadata editing module 216 and encode it in a predefined encoding scheme. In one embodiment, the encoding module 218 may re-encode edited video content by adding a new image and dynamic tone metadata to the bit stream of the original image of the video content. In one embodiment, the encoding module 218 may encode the new image and dynamic tone metadata separately from (or independently of) the original image and insert it into the bit stream of the original image. For example, the new image and dynamic tone metadata may be encoded as an intra picture (e.g., I picture). As another example, the new image and dynamic tone metadata may be encoded as a P picture referring to the reference (e.g., I picture) of the original image. For instance, the predefined encoding scheme may include, but not limited to, high efficiency video coding (HEVC) or H.264 encoding scheme.

According to various embodiments, the electronic device (e.g., electronic device 101 in FIG. 1 or electronic device 201 in FIG. 2) may include: a display device (e.g., display device 160 in FIG. 1); and at least one processor (e.g., processor 120 in FIG. 1) operatively connected to the display device, wherein the at least one processor may be configured to generate a third image to be inserted between a first image and a second image continuous with the first image among a plurality of images included in video content, generate dynamic tone metadata of the third image based on dynamic tone metadata of the first image and the second image, and update the video content by adding the third image and the dynamic tone metadata of the third image.

In various embodiments, the at least one processor may be configured to generate dynamic tone metadata of the third image based on an average of dynamic tone metadata of the first image and dynamic tone metadata of the second image.

In various embodiments, the at least one processor may be configured to: identify a weight corresponding to the first image and the second image based on at least one of a reference ratio of the first image and the second image referenced to generate the third image, a time interval between the first image, the second image, and the third image, a sequence including the first image, the second image, and the third image, or group of pictures (GOP) information including the first image, the second image, and the third image; and apply the weight to dynamic tone metadata of the first image and dynamic tone metadata of the second image to generate dynamic tone metadata of the third image. For example, the image sequence and/or GOP may be set based on a scene change.

In various embodiments, the electronic device may further include a memory (e.g., memory 130 in FIG. 1) to store a plurality of images having dynamic tone metadata. The at least one processor may be configured to select an image corresponding to the third image from among the plurality of images stored in the memory or a plurality of images stored in an external electronic device, and set dynamic tone metadata of the third image to dynamic tone metadata of the selected image corresponding to the third image.

In various embodiments, the at least one processor may be configured to generate the third image based on the second image when a difference between the first image and the second image satisfies a specified condition, and generate the third image based on the first image and the second image when the difference between the first image and the second image does not satisfy the specified condition.

In various embodiments, when the third image is generated based on the second image, the at least one processor may be configured to set dynamic tone metadata of the third image to dynamic tone metadata of the second image.

According to various embodiments, the electronic device (e.g., electronic device 101 in FIG. 1 or electronic device 201 in FIG. 2) may include: a display device (e.g., display device 160 in FIG. 1); and at least one processor (e.g., processor 120 in FIG. 1) operatively connected to the display device, wherein the at least one processor may be configured to: generate first video content by extracting at least one image from one or more of video contents; identify, when there is a first image not having dynamic tone metadata among at least one image included in the first video content, the original video content including the first image among the one or more of video contents; identify at least one image having dynamic tone metadata among a plurality of images included in the original video content; select an image that satisfies a specified condition in playback time from among the identified at least one image having dynamic tone metadata; and generate dynamic tone metadata of the first image based on dynamic tone metadata of the selected image.

In various embodiments, the at least one processor may be configured to identify at least one image preceding the first image in playback time among one or more images of the original video content having dynamic tone metadata, and select an image closest to the first image in playback time among the at least one image preceding the first image in playback time.

In various embodiments, the at least one processor may be configured to select an image closest to the first image in playback time among at least one image of the original video content having dynamic tone metadata.

In various embodiments, the at least one processor may be configured to generate dynamic tone metadata of the first image by copying dynamic tone metadata of the selected image.

In various embodiments, the at least one processor may be configured to generate the first video content by extracting at least one image from second video content.

In various embodiments, the at least one processor may be configured to generate the first video content by connecting at least one image included in second video content and at least one image included in third video content.

In various embodiments, the at least one processor may be configured to compare dynamic tone metadata of a second image being the last of at least one image of the second video content included in the first video content with dynamic tone metadata of a third image being a first of at least one image of the third video content included in the first video content, wherein the third image is continuous with the second image within the first video content, and update the dynamic tone metadata of the third image based on the dynamic tone metadata of the second image if the difference in dynamic tone metadata between the second image and the third image satisfies a specified condition.

In various embodiments, if the difference in dynamic tone metadata between the second image and the third image satisfies the specified condition, the at least one processor may be configured to update the dynamic tone metadata of the third image based on the dynamic tone metadata of at least one of the second image, the third image, or a fourth image continuous with the third image.

In various embodiments, the at least one processor may be configured to update the dynamic tone metadata of the third image based on an average of dynamic tone metadata of at least two of the second image, the third image, or the fourth image.

In various embodiments, the at least one processor may be configured to identify a weight corresponding to the second image, the third image, and the fourth image based on at least one of a sequence including the second image, the third image and the fourth image, or information on a group of pictures (GOP) including the second image, the third image and the fourth image, and update dynamic tone metadata of the third image by applying the weight to dynamic tone metadata of at least one of the second image, the third image, or the fourth image.

In various embodiments, the at least one processor may be configured to maintain dynamic tone metadata of the third image if the difference in dynamic tone metadata between the second image and the third image does not satisfy the specified condition.

According to various embodiments, the electronic device (e.g., electronic device 101 in FIG. 1 or electronic device 201 in FIG. 2) may include: a memory (e.g., memory 130 in FIG. 1) to store a plurality of images having dynamic tone metadata; a display (e.g., display device 160 in FIG. 1); and at least one processor (e.g., processor 120 in FIG. 1) operatively connected to the memory and the display, wherein the at least one processor may be configured to: update a first image among a plurality of images belonging to video content based on video editing; select a second image corresponding to the updated first image from among the plurality of images stored in the memory or a plurality of images stored in another electronic device; and set dynamic tone metadata of the updated first image by updating dynamic tone metadata of the first image based on dynamic tone metadata of the second image corresponding to the updated first image.

In various embodiments, the at least one processor may be configured to set dynamic tone metadata of the updated first image by copying dynamic tone metadata of the second image corresponding to the updated first image.

In various embodiments, the video editing may include at least one of scaling, object insertion, or filtering.

Figure 3:
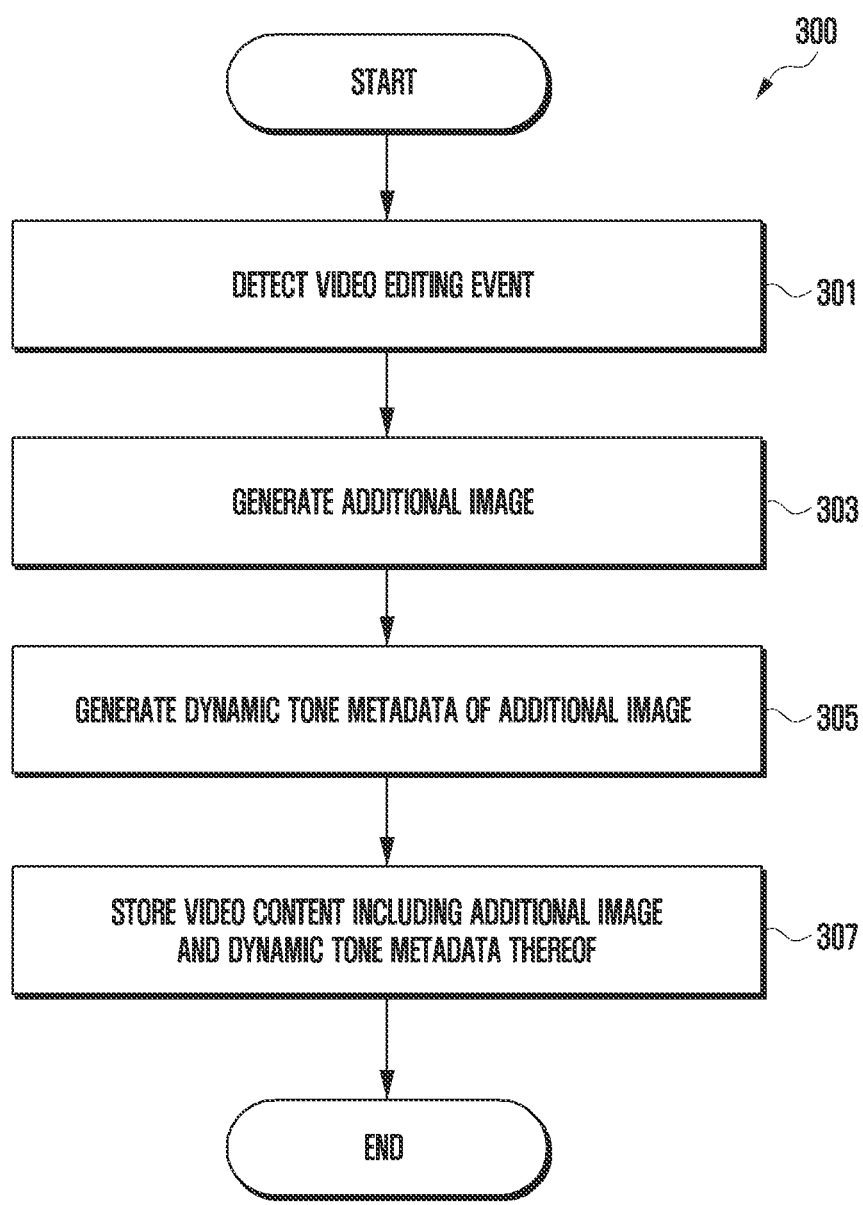
FIG. 3 is a flowchart for an electronic device to generate dynamic tone metadata for an added image according to an embodiment of the disclosure.

FIG. 3 is a flowchart for an electronic device to generate dynamic tone metadata for an added image according to an embodiment of the disclosure.

In the following embodiments, operations may be performed in sequence but are not necessarily performed in sequence. For example, operations may be performed differently from the listed order, and at least two operations may be performed in parallel. For instance, the electronic device may be the electronic device 101 in FIG. 1 or the electronic device 201 in FIG. 2. In the following description, at least some operations of the flowchart 300 of FIG. 3 will be described with reference to FIGS. 4, 5, 6, 7A, and 7B.

Figure 4:
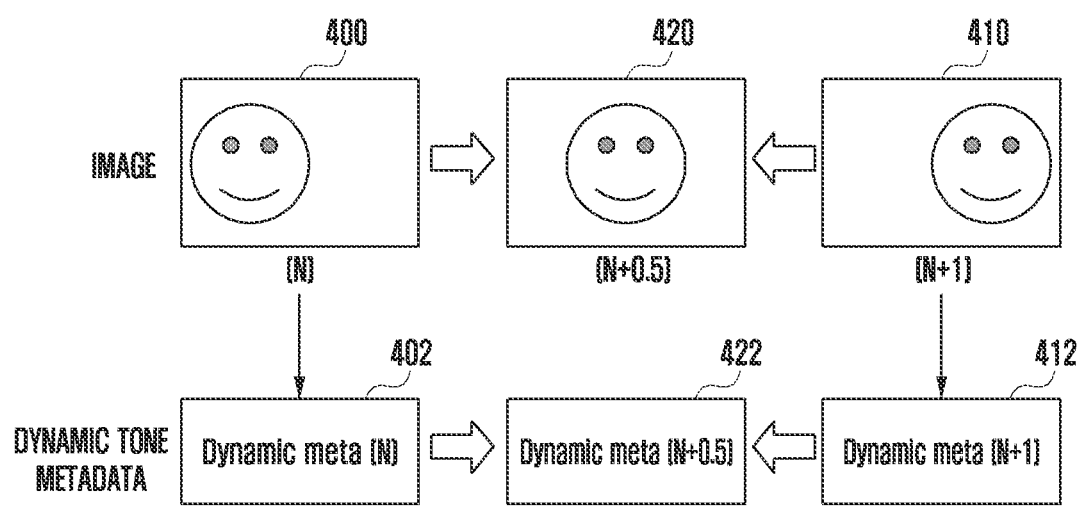
FIG. 4 illustrates generation of an additional image in an electronic device according to an embodiment of the disclosure.

FIG. 4 illustrates generation of an additional image in an electronic device according to an embodiment of the disclosure.

Figure 5:
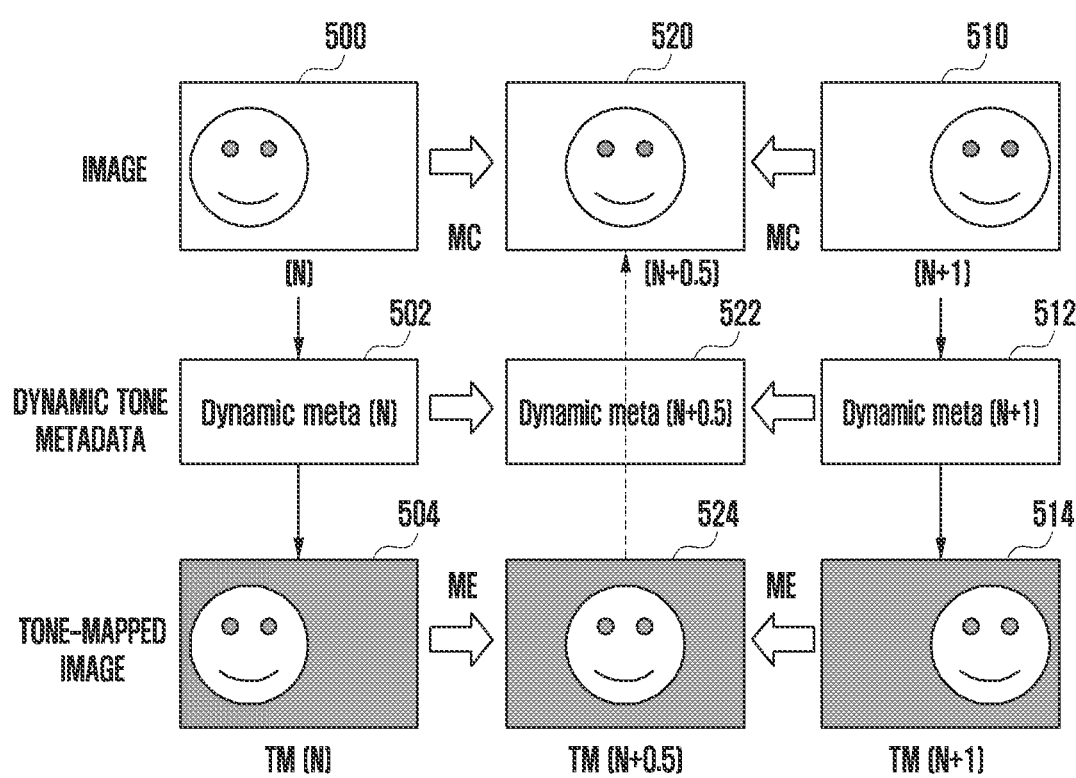
FIG. 5 illustrates generation of an additional image based on a tone-mapped image in an electronic device according to an embodiment of the disclosure.

FIG. 5 illustrates generation of an additional image based on a tone-mapped image in an electronic device according to an embodiment of the disclosure.

Figure 6:
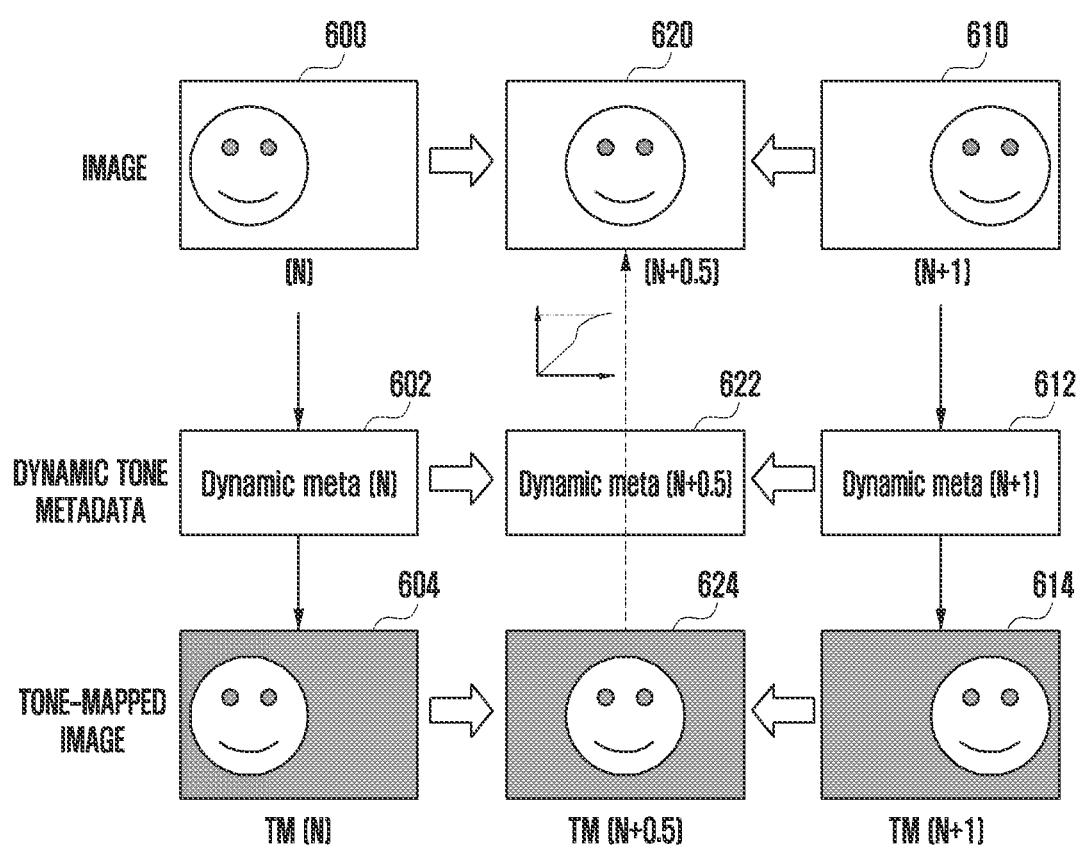
FIG. 6 illustrates generation of an additional image based on a tone-mapped image and dynamic tone metadata in an electronic device according to an embodiment of the disclosure.

FIG. 6 illustrates generation of an additional image based on a tone-mapped image and dynamic tone metadata in an electronic device according to an embodiment of the disclosure.

Figure 7A:
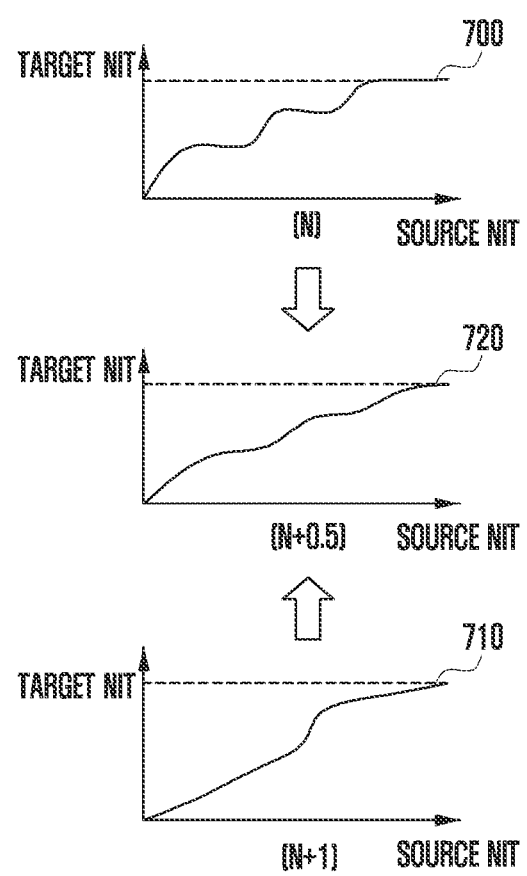
FIGS. 7A and 7B illustrate generation of dynamic tone metadata in an electronic device according to various embodiments of the disclosure.
Figure 7B:
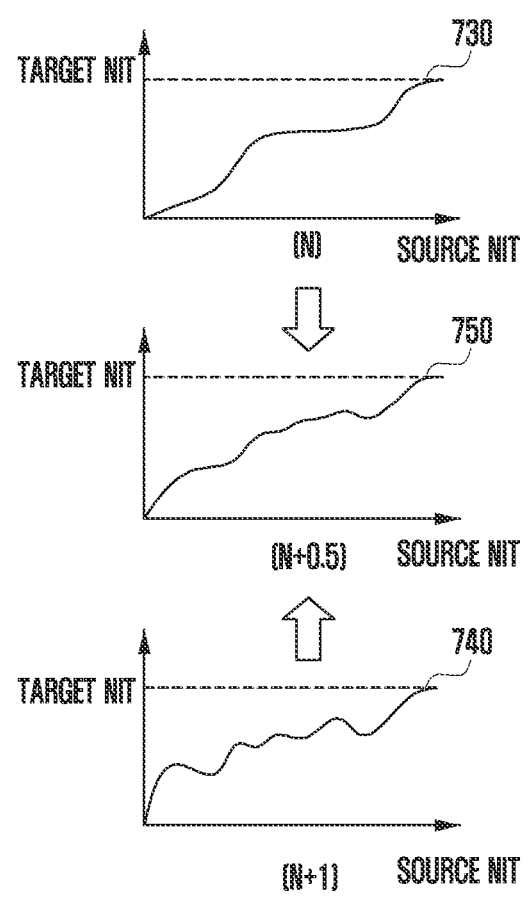

FIGS. 7A and 7B illustrate generation of dynamic tone metadata in an electronic device according to various embodiments of the disclosure.

Referring to FIG. 3, in various embodiments, at operation 301, the electronic device (e.g., processor 120 in FIG. 1 or processor 210 in FIG. 2) may detect an occurrence of a video editing event. In one embodiment, when selection of an edit menu for video content is detected according to a user input, the processor 210 may determine that a video editing event corresponding to the edit menu has occurred.

In various embodiments, at operation 303, the electronic device (e.g., processor 120 or 210) may generate an additional image to be inserted into the video content through video editing corresponding to the video editing event. In one embodiment, when performing FRC editing (e.g., framerate up conversion) based on the video editing event, the processor 210 may generate at least one new image to be inserted between images of the video content so as to correspond to the target frame rate.

Referring to FIG. 4, the processor 210 may generate image n+0.5 (420) through interpolation based on image n (400) and image n+1 (410).

In various embodiments, at operation 305, the electronic device (e.g., processor 120 or 210) may generate dynamic tone metadata of the additional image based on dynamic tone metadata of at least one reference image. In one embodiment, when image n+0.5 (420) is generated as shown in FIG. 4, the processor 210 may generate dynamic tone metadata 422 of image n+0.5 (420) based on dynamic tone metadata 402 of image n (400) and dynamic tone metadata 412 of image n+1 (410). For instance, the reference images of image n+0.5 (420) may include image n (400) and image n+1 (410) having been referenced to generate image n+0.5 (420).

Referring to FIG. 7A, the processor 210 may generate dynamic tone metadata 720 of image n+0.5 based on the average of dynamic tone metadata 700 of image n and dynamic tone metadata 710 of image n+1.

Referring to FIG. 7B, the processor 210 may generate dynamic tone metadata 750 of image n+0.5 based on the average of dynamic tone metadata 730 of image n and dynamic tone metadata 740 of image n+1. For instance, dynamic tone metadata is information related to the tone (or brightness) to represent an image according to the intention of an artist, and may include a tone mapping curve corresponding to the ratio between the target nit and the source nit as shown in FIG. 7B. For instance, the source nit may correspond to the brightness of the mastering display (or monitor) at the time of production of the video content, and the target nit may correspond to the brightness of the display of an electronic device (e.g., electronic device 201) for reproducing the video content. For instance, 'n' is identification information of an image included in the video content, and may be an integer value.

In various embodiments, at operation 307, the electronic device (e.g., processor 120 or 210) may store the video content including the additional image and dynamic tone metadata thereof. In one embodiment, the processor 210 may insert the additional image and dynamic tone metadata thereof into the bit stream of the video content for storage. For example, the processor 210 may insert the additional image and dynamic tone metadata thereof into video content of a first FPS (e.g., 240 FPS) based on the FPS editing to generate video content of a second FPS (e.g., 480 FPS or 960 FPS). In this case, when the video content of the second FPS is encoded at a reference FPS (e.g., 30 FPS), it may be reproduced as images where the motion of the object is slow (e.g., slow motion) compared to the video content of the first FPS.

In various embodiments, the electronic device (e.g., processor 120 or 210) may generate an additional image based on a tone-mapped image.

Referring to FIG. 5, the processor 210 may generate a motion vector (524) through motion estimation based on tone-mapped image n (504) and tone-mapped image n+1 (514). Image n+0.5 (520) may be generated through motion compensation using the motion vector (524) based on image n (500) (not tone-mapped) and image n+1 (510) (not tone-mapped). The dynamic tone metadata 522 of image n+0.5 (520) may be generated based on dynamic tone metadata 502 of image n (500) and dynamic tone metadata 512 of image n+1 (510). For instance, tone-mapped image n (504) may correspond to image n (500) mapped to the brightness of the display of the electronic device 201 based on the dynamic tone metadata 502 of image n (500).

Referring to FIG. 6, the processor 210 may generate tone-mapped image n+0.5 (624) through interpolation based on tone-mapped image n (604) and tone-mapped image n+1 (614). The processor 210 may generate dynamic tone metadata 622 of image n+0.5 (620) based on dynamic tone metadata 602 of image n (600) and dynamic tone metadata 612 of image n+1 (610). Image n+0.5 (620) may be generated through inverse tone mapping of tone-mapped image n+0.5 (624) based on the dynamic tone metadata 622.

Figure 8:
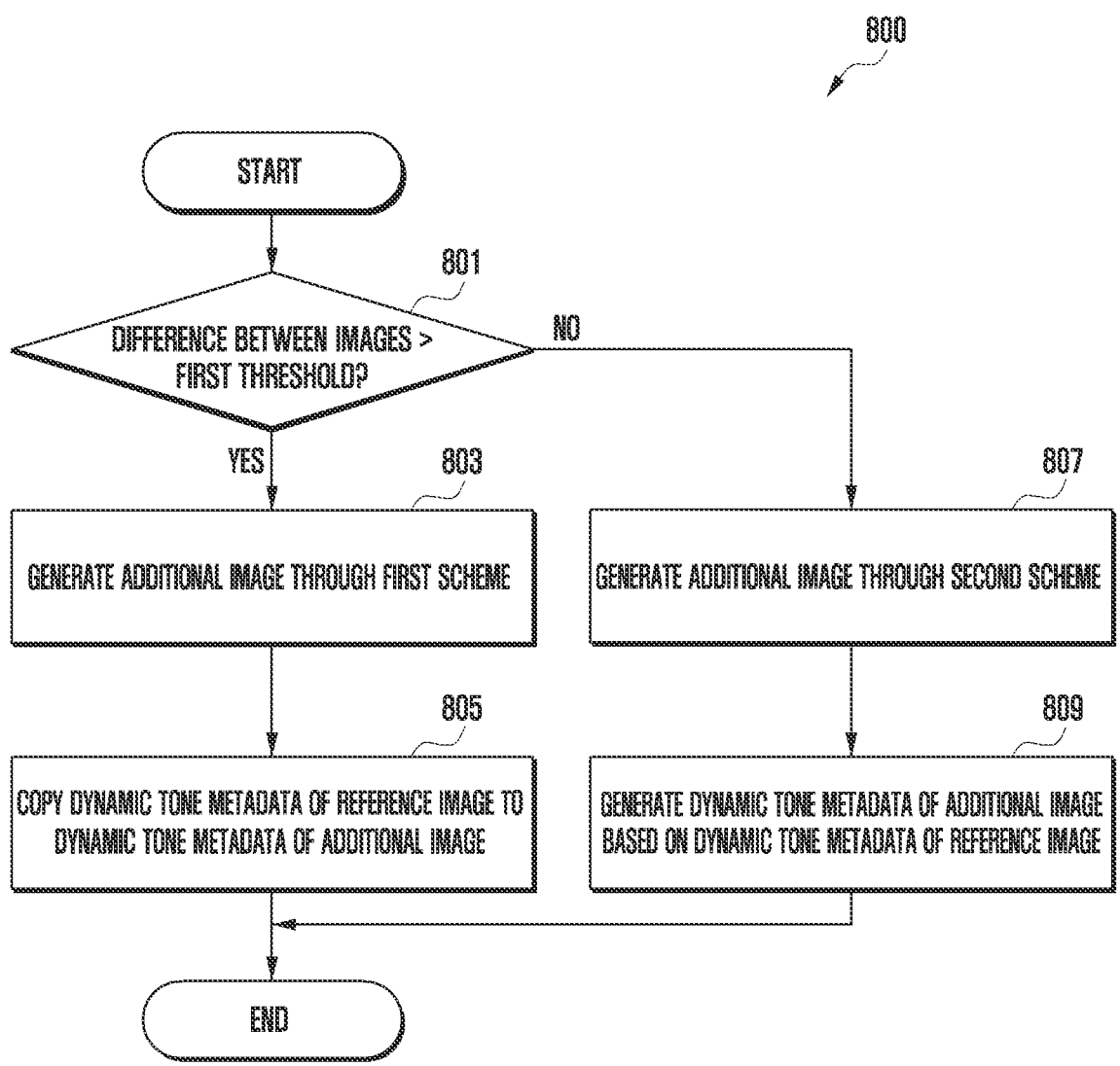
FIG. 8 is a flowchart for an electronic device to generate dynamic tone metadata according to an embodiment of the disclosure.

FIG. 8 is a flowchart for an electronic device to generate dynamic tone metadata according to an embodiment of the disclosure.

The operations of FIG. 8 in flowchart 800 described below may be details of operation 303 and operation 305 in FIG. 3. In the following embodiments, operations may be performed in sequence but are not necessarily performed in sequence. For example, operations may be performed differently from the listed order, and at least two operations may be performed in parallel. For instance, the electronic device may be the electronic device 101 in FIG. 1 or the electronic device 201 in FIG. 2. In the following description, at least some operations of FIG. 3 will be described with reference to FIGS. 9, 10A, 10B, and 11.

Figure 9:
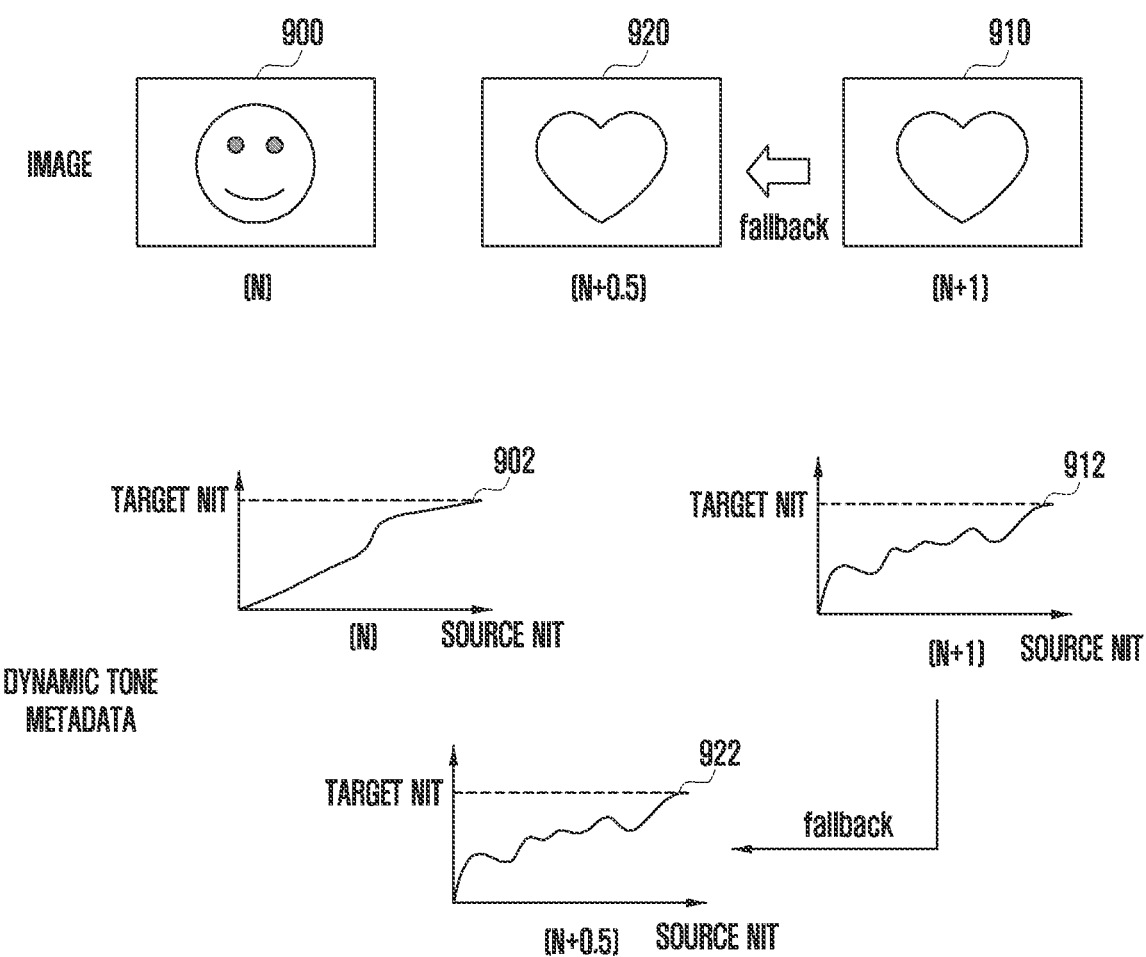
FIG. 9 illustrates generation of dynamic tone metadata based on a scheme for generating an additional image in an electronic device according to an embodiment of the disclosure.

FIG. 9 illustrates generation of dynamic tone metadata based on a scheme for generating an additional image in an electronic device according to an embodiment of the disclosure.

Figure 10A:
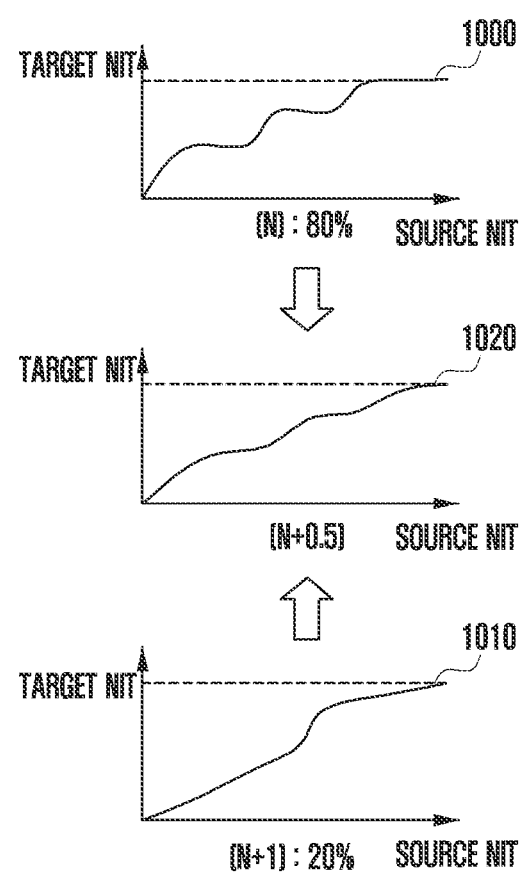
FIGS. 10A and 10B illustrate generation of dynamic tone metadata based on a reference ratio between reference images in an electronic device according to various embodiments of the disclosure.
Figure 10B:
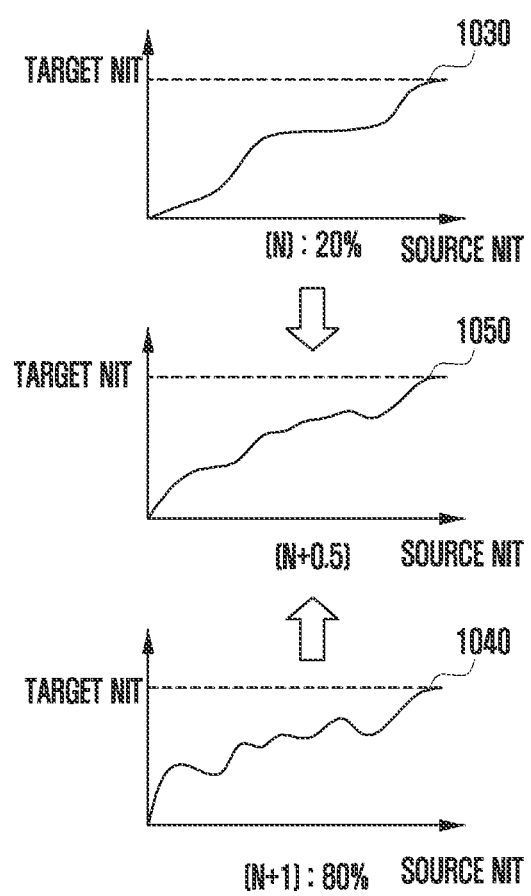

FIGS. 10A and 10B illustrate generation of dynamic tone metadata based on a reference ratio between reference images in an electronic device according to various embodiments of the disclosure.

Figure 11:
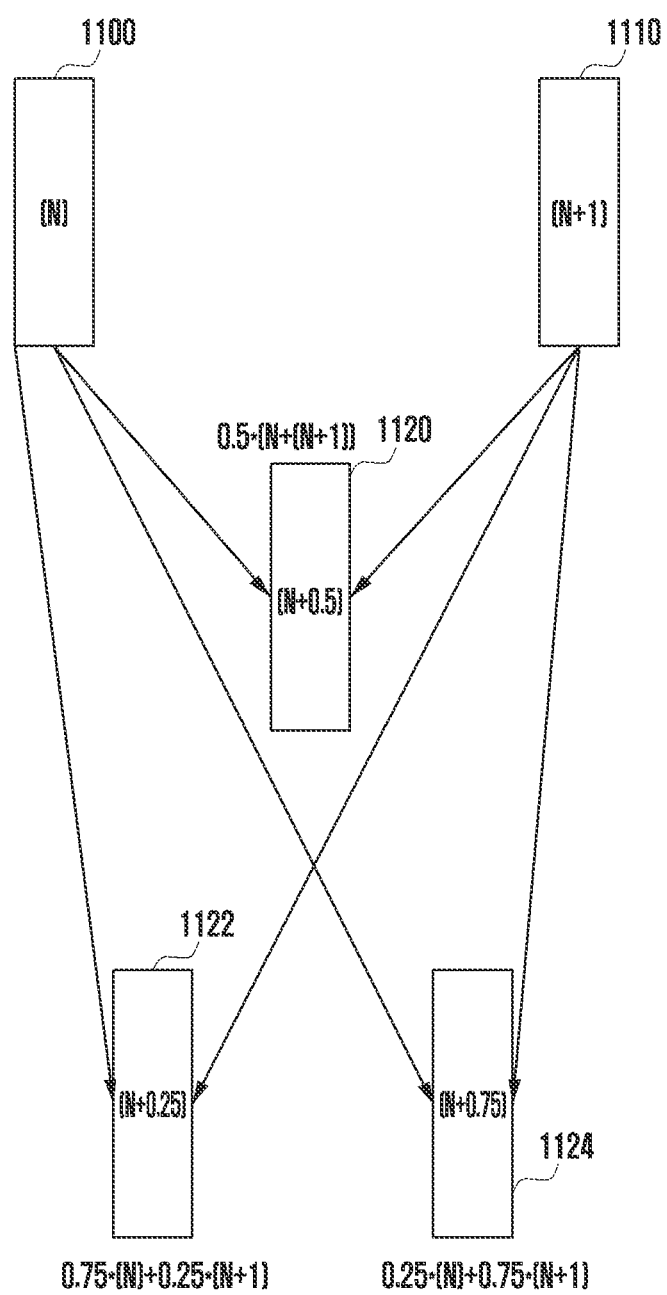
FIG. 11 illustrates generation of dynamic tone metadata based on a distance to reference images in an electronic device according to an embodiment of the disclosure.

FIG. 11 illustrates generation of dynamic tone metadata based on the distance to reference images in an electronic device according to an embodiment of the disclosure.

Referring to FIG. 8, in various embodiments, when the electronic device (e.g., processor 120 in FIG. 1 or processor 210 in FIG. 2) detects an occurrence of an event for video editing (e.g., operation 301 in FIG. 3), at operation 801, it may determine whether the difference between images (e.g., reference images) between which the additional image is inserted exceeds a first threshold. In one embodiment, as shown in FIG. 9, when generating an image to be inserted between image n (900) and image n+1 (910), the processor 210 may calculate the difference between image n (900) and image n+1 (910). For instance, the difference between images may include a difference in pixel value between a first image and a second image or a difference in feature point therebetween. For instance, the first threshold may include a reference value for determining whether images are similar.

In various embodiments, if the difference between the images between which the additional image is inserted exceeds the first threshold (e.g., "yes" branch of operation 801), at operation 803, the electronic device (e.g., processor 120 or 210) may generate the additional image through a first scheme (e.g., fallback). In one embodiment, when the difference between images between which the additional image is inserted exceeds the first threshold, the processor 210 may determine that a scene change has occurred or the object movement has been relatively large.

Referring to FIG. 9, the processor 210 may generate image n+0.5 (920) by copying image n+1 (910) according to the first scheme (e.g., fallback).

In various embodiments, at operation 805, the electronic device (e.g., processor 120 or 210) may generate dynamic tone metadata of the additional image by copying dynamic tone metadata of the image that is referenced to generate the additional image according to the first scheme (e.g., fallback). In one embodiment, as shown in FIG. 9, when image n+0.5 (920) is generated by copying image n+1 (910), the processor 210 may generate dynamic tone metadata 922 of image n+0.5 (920) by copying dynamic tone metadata 912 of image n+1 (910). For example, the processor 210 may generate dynamic tone metadata 922 of image n+0.5 (920) by using dynamic tone metadata 912 of the image n+1 (910) regardless of dynamic tone metadata 902 of the image n 900.

In various embodiments, if the difference between the images between which the additional image is inserted is less than or equal to the first threshold (e.g., "no" branch of operation 801), at operation 807, the electronic device (e.g., processor 120 or 210) may generate the additional image through a second scheme (e.g., interpolation). In one embodiment, when the difference between images between which the additional image is inserted is less than or equal to the first threshold, the processor 210 may determine that the images between which the additional image is inserted are relatively similar. In this case, as shown in FIG. 4, the processor 210 may generate image n+0.5 (420) through the second scheme (e.g., interpolation) based on image n (400) and image n+1 (410).

In various embodiments, at operation 809, the electronic device (e.g., processor 120 or 210) may generate dynamic tone metadata of the additional image based on dynamic tone metadata of the image that is referenced to generate the additional image according to the second scheme (e.g., interpolation). In one embodiment, the processor 210 may generate dynamic tone metadata of the additional image by applying a weight corresponding to a ratio (e.g., reference ratio) between reference images referenced to generate the additional image to dynamic tone metadata of the reference images. For example, image n+0.5 may be generated by referencing image n at about 80 percent and image n+1 at about 20 percent.

Referring to FIG. 10A, dynamic tone metadata 1020 of image n+0.5 may be generated by applying a first weighting coefficient (e.g., about 0.8) to the dynamic tone metadata 1000 of image n and applying a second weighting coefficient (e.g., about 0.2) to the dynamic tone metadata 1010 of image n+1. As another example, image n+0.5 may be generated by referencing image n at about 20 percent and image n+1 at about 80 percent.

Referring to FIG. 10B, dynamic tone metadata 1050 of image n+0.5 may be generated by applying a first weighting coefficient (e.g., about 0.2) to the dynamic tone metadata 1030 of image n and applying a second weighting coefficient (e.g., about 0.8) to the dynamic tone metadata 1040 of image n+1.

In one embodiment, the processor 210 may generate dynamic tone metadata of the additional image by applying a weight corresponding to the time interval between the additional image and the reference image to dynamic tone metadata of the reference image.

Referring to FIG. 11, image n+0.5 (1120) may be inserted between image n (1100) and image n+1 (1110). In this case, the processor 210 may generate dynamic tone metadata of image n+0.5 (1120) by applying a third weighting coefficient (e.g., about 0.5) equally to dynamic tone metadata of image n (1100) and dynamic tone metadata of image n+1 (1110). As another example, as shown in FIG. 11, image n+0.25 (1122) may be inserted at a position relatively closer to image n (1100) (e.g., about 0.25) than image n+1 (1110). In this case, the processor 210 may generate dynamic tone metadata of image n+0.25 (1122) by applying a fourth weighting coefficient (e.g., about 0.75) to the dynamic tone metadata of image n (1100) and applying a fifth weighting coefficient (e.g., about 0.25) to the dynamic tone metadata of image n+1 (1110). As another example, as shown in FIG. 11, image n+0.75 (1124) may be inserted at a position relatively closer to image n+1 (1110) (e.g., about 0.75) than image n (1100). In this case, the processor 210 may generate dynamic tone metadata of image n+0.75 (1124) by applying a fifth weighting coefficient (e.g., about 0.25) to the dynamic tone metadata of image n (1100) and applying a fourth weighting coefficient (e.g., about 0.75) to the dynamic tone metadata of image n+1 (1110).

In various embodiments, when encoding video content including an additional image, the electronic device (e.g., processor 120 or 210) may generate dynamic tone metadata of the additional image by applying a weight corresponding to the ratio (e.g., reference ratio) between reference images referenced in encoding the additional image to the dynamic tone metadata of the reference images.

In various embodiments, the electronic device (e.g., processor 120 or 210) may set a weighting coefficient to be applied to dynamic tone metadata of a reference image in units of a sequence of scenes or in units of a group of pictures (GOP) according to whether the additional image and the reference image belong to the same scene or GOP. In one embodiment, when the additional image and the reference images belong to the same sequence or GOP, the electronic device may set weighting coefficients to be applied to the dynamic tone metadata of the reference images based on at least one of a reference ratio between the reference images or time intervals between the additional image and the reference images in order to generate dynamic tone metadata of the additional image. In one embodiment, when at least one of the reference images belongs to a sequence or GOP different from that of the additional image, the electronic device may minimize or zero the weighting coefficient to be applied to dynamic tone metadata of the reference image belonging to the different sequence or GOP.

Figure 12:
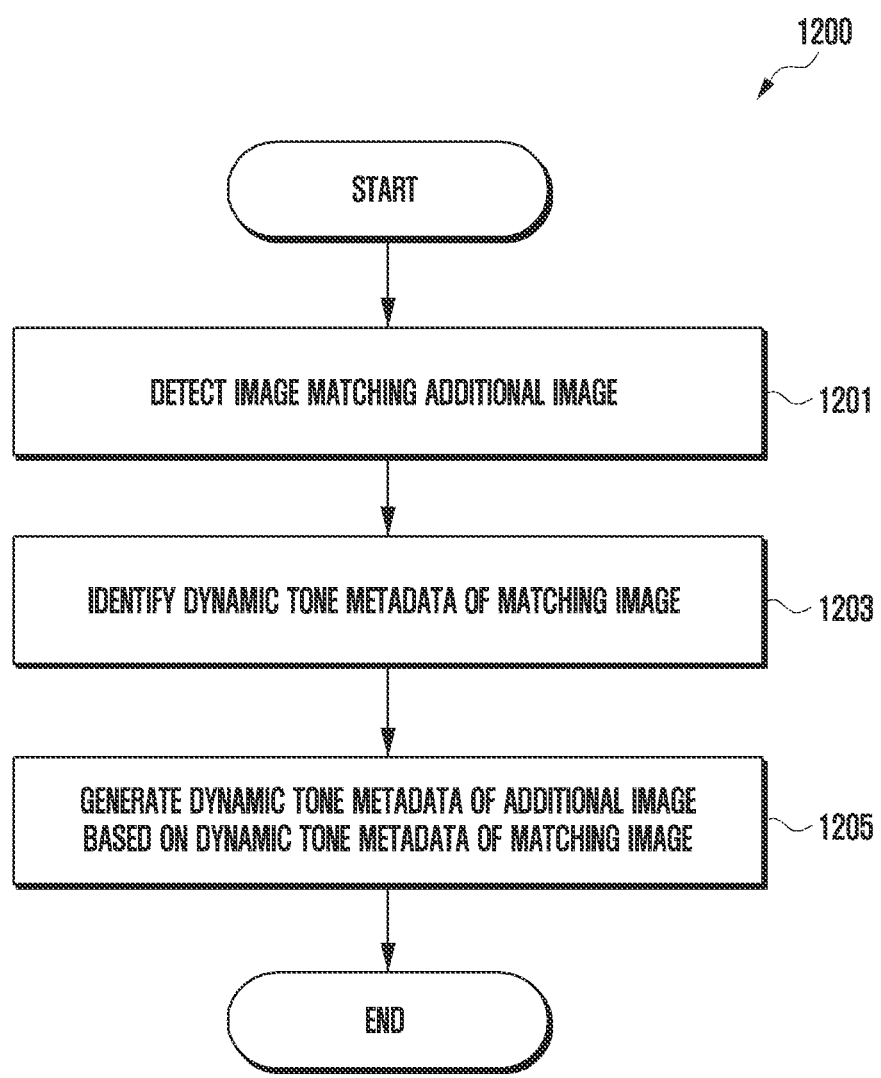
FIG. 12 is a flowchart for an electronic device to generate dynamic tone metadata of an added image based on predefined dynamic tone metadata according to an embodiment of the disclosure.

FIG. 12 is a flowchart for an electronic device to generate dynamic tone metadata of an added image based on pre-defined dynamic tone metadata according to an embodiment of the disclosure.

The operations in flowchart 1200 of FIG. 12 described below may be details of operation 305 in FIG. 3. In the following embodiments, operations may be performed in sequence but are not necessarily performed in sequence. For example, operations may be performed differently from the listed order, and at least two operations may be performed in parallel. For instance, the electronic device may be the electronic device 101 in FIG. 1 or the electronic device 201 in FIG. 2.

Referring to FIG. 12, when the additional image is generated based on video editing (e.g., operation 303 in FIG. 3), at operation 1201, the electronic device (e.g., processor 120 in FIG. 1 or processor 210 in FIG. 2) may detect an image matching the additional image among images having dynamic tone metadata stored in the memory (e.g., memory 130 in FIG. 1) or a server (e.g., server 108 in FIG. 1). In one embodiment, the processor 210 may select an image having the smallest difference from the additional image among the images stored in the memory or the server as an image matching the additional image. For instance, the difference from the additional image may indicate a difference in pixel value or feature point between the additional image and an image stored in the memory or server. For example, the images stored in the memory or the server may include at least one image generated by the electronic device 201 using a camera (e.g., camera module 180 in FIG. 1) and/or at least one image generated by an expert. For example, the images stored in the memory or the server may be stored as image data itself, or may be stored in the form of at least one of sub-sampled data, differential pulse code modulated (DPCM) image, feature point data, or frequency domain data.

In various embodiments, at operation 1203, the electronic device (e.g., processor 120 or 210) may identify dynamic tone metadata of the image matching the additional image. For instance, the image matching the additional image may indicate an image having a difference from the additional image less than or equal to the first threshold.

In various embodiments, at operation 1205, the electronic device (e.g., processor 120 or 210) may generate dynamic tone metadata of the additional image based on dynamic tone metadata of the image matching the additional image. In one embodiment, the processor 210 may use dynamic tone metadata of the image matching the additional image as dynamic tone metadata of the additional image.

In various embodiments, the electronic device (e.g., processor 120 or 210) may mark the additional image and its dynamic tone metadata inserted in the video content to be distinguished from the original images and their dynamic tone metadata. In one embodiment, the processor 210 may configure the identification number of the additional image separately from the original image. In one embodiment, the processor 210 may record the dynamic tone metadata twice in succession for the additional image to indicate that the corresponding additional image is an image inserted through video editing. In one embodiment, the processor 210 may indicate that the additional image is an image inserted through video editing by inserting specific information set as a dummy in the last part of the payload of the additional image. For example, when the additional image is encoded in joint photography experts group (JPEG), specific information set as a dummy for identifying the additional image may be inserted behind the "end of picture" marker. As another example, when the additional image is encoded in high efficiency video coding (HEVC), specific information set as a dummy for identifying the newly added video may be inserted into "slice segment header extension data byte" at the end of slice data. Accordingly, when the electronic device 201 (or the user) edits (or re-edits) video content, it may perform editing or re-editing by using only the images desired by the user (e.g., original images), thereby preventing deterioration of the picture quality of the video content.

Figure 13:
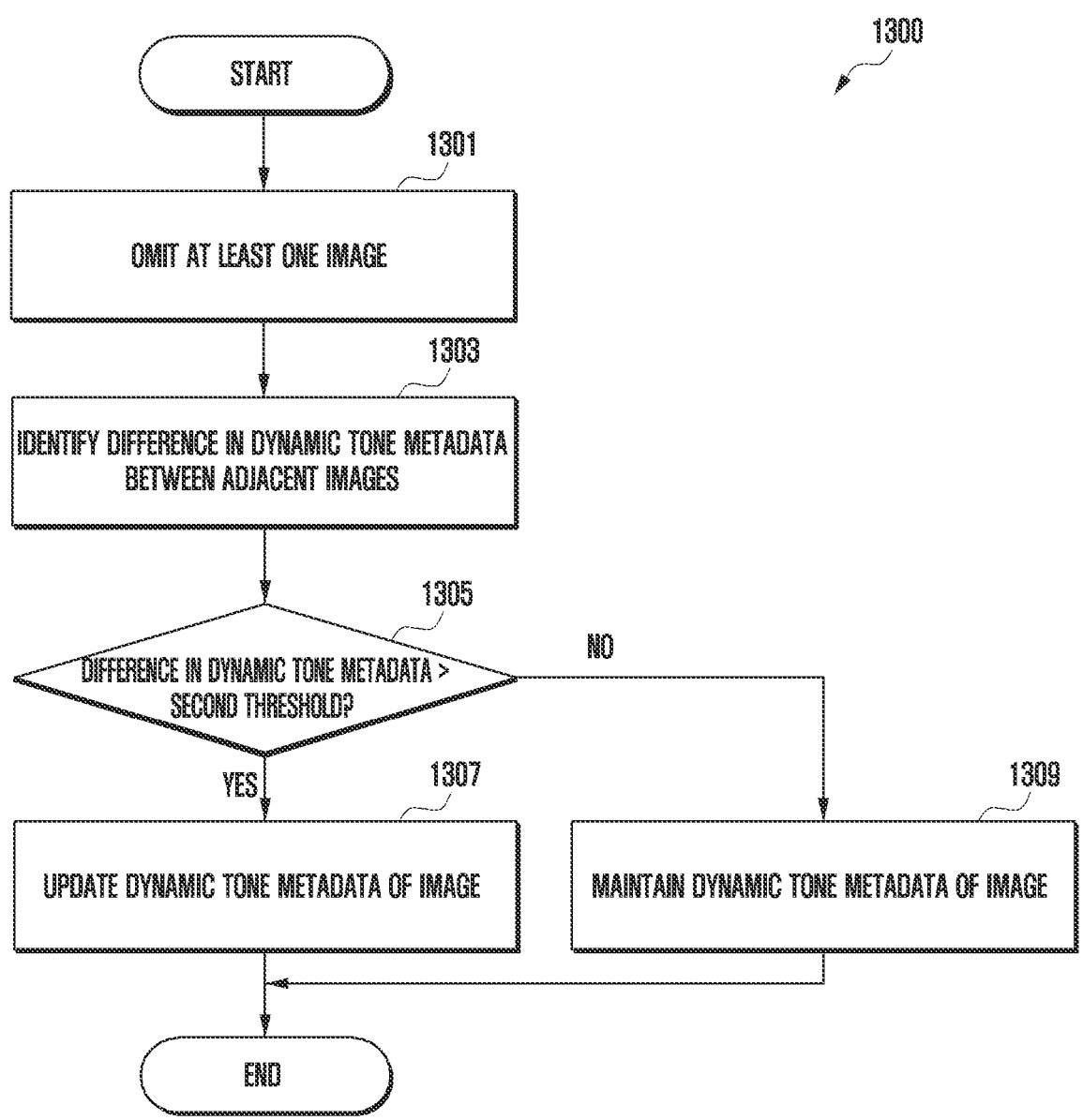
FIG. 13 is a flowchart for an electronic device to edit dynamic tone metadata of an image to which FRC editing is applied according to an embodiment of the disclosure.

FIG. 13 is a flowchart for an electronic device to edit dynamic tone metadata of an image to which FRC editing is applied according to an embodiment of the disclosure.

In the following embodiments, operations may be performed in sequence but are not necessarily performed in sequence. For example, operations may be performed differently from the listed order, and at least two operations may be performed in parallel. For instance, the electronic device may be the electronic device 101 in FIG. 1 or the electronic device 201 in FIG. 2. In the following description, at least some operations of FIG. 13 in flowchart 1300 will be described with reference to FIG. 14.

Figure 14:
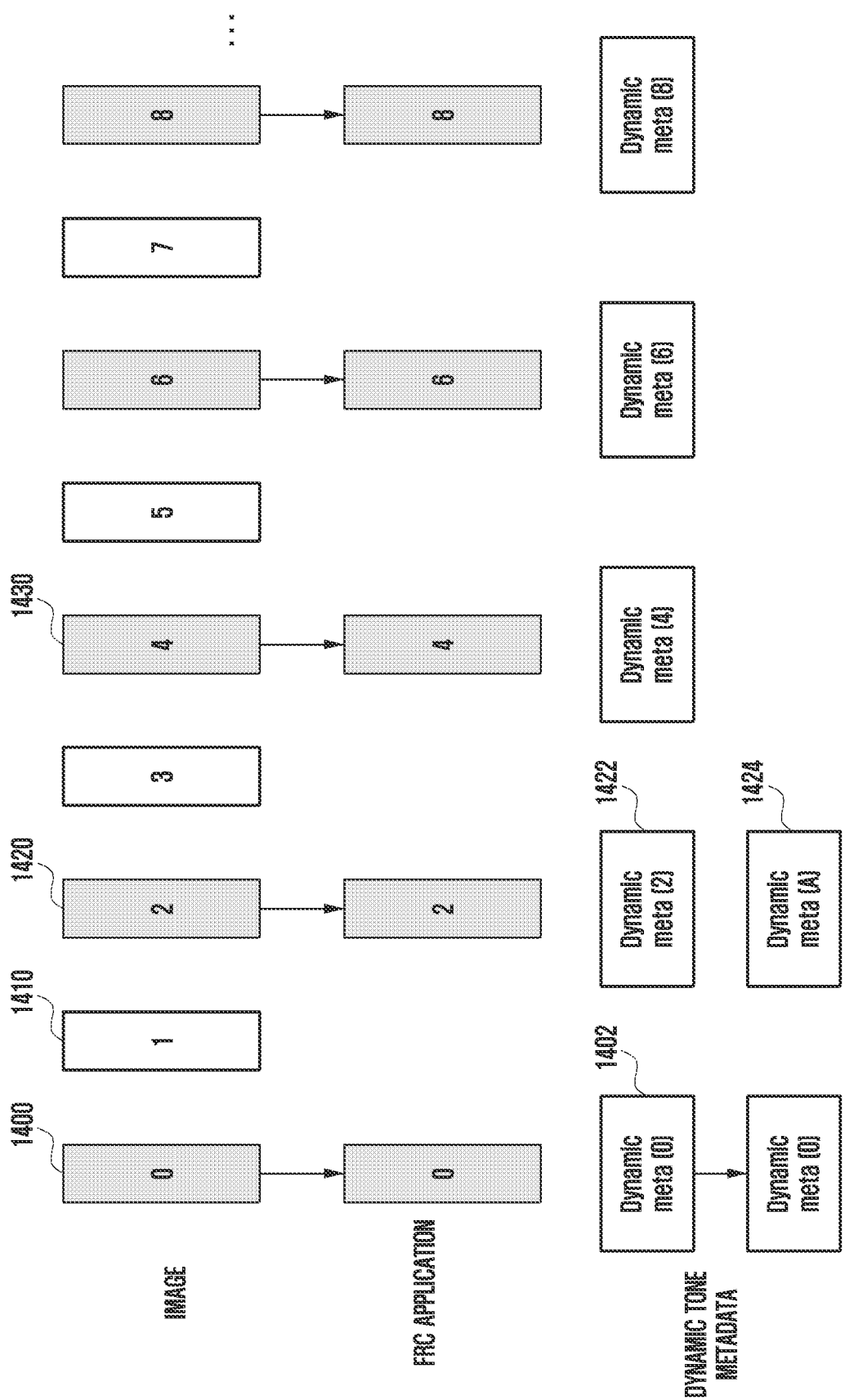
FIG. 14 is a configuration for removing at least one image through FRC editing in an electronic device according to an embodiment of the disclosure.

FIG. 14 is a configuration for removing at least one image through FRC editing in an electronic device according to an embodiment of the disclosure.

Referring to FIG. 13, in various embodiments, at operation 1301, the electronic device (e.g., processor 120 in FIG. 1 or processor 210 in FIG. 2) may omit at least one image of video content based on a video editing technique (e.g., framerate down conversion).

Referring to FIG. 14, the processor 210 may omit at least some images 1410 among consecutive images 1400, 1410 and 1420 to correspond to the target frame rate.

In various embodiments, at operation 1303, the electronic device (e.g., processor 120 or 210) may check a difference in dynamic tone metadata between a plurality of images included in the video content edited by the FRC editing technique. In one embodiment, in FIG. 14, for image 0 (1400) and image 2 (1420) adjacent in the video content edited according to the FRC editing technique, the processor 210 may check a difference between dynamic tone metadata 1402 of image 0 (1400) and dynamic tone metadata 1422 of image 2 (1420). For example, the difference in dynamic tone metadata is a difference between syntax values defined in the dynamic tone metadata, and may include a difference between tone mapping curves representing the tones (or brightness) of the corresponding images.

In various embodiments, at operation 1305, the electronic device (e.g., processor 120 or 210) may determine whether the difference in dynamic tone metadata between adjacent images exceeds a second threshold. For instance, the second threshold is a reference value for determining whether pieces of dynamic tone metadata are similar, and may be set differently for each syntax included in the dynamic tone metadata or may be set to correspond to the sum of differences in syntax included in the dynamic tone metadata.

In various embodiments, if the difference in dynamic tone metadata between adjacent images exceeds the second threshold (e.g., "yes"-branch of operation 1305), at operation 1307, the electronic device (e.g., processor 120 or 210) may update dynamic tone metadata of at least one adjacent image. In one embodiment, in FIG. 14, if the difference between dynamic tone metadata 1402 of image 0 (1400) and dynamic tone metadata 1422 of image 2 (1420) exceeds the second threshold, the processor 210 may update the dynamic tone metadata of image 2 (1420) (1424). For example, the processor 210 may update the dynamic tone metadata of image 2 (1420) (1424) based on dynamic tone metadata of at least one of image 2 (1420), image 0 (1400) adjacent to image 2 (1420), or image 4 (1430) adjacent to image 2 (1420). For instance, the updated dynamic tone metadata may include an average of dynamic tone metadata of reference images or a sum of dynamic tone metadata of reference images to which a weight is applied. For example, the dynamic tone metadata of image n+1 may be updated based on the average of dynamic tone metadata of reference images as shown in Table 1 below.

TABLE 1

| Dynamic tone | Dynamic tone metadata syntax value | | |
|---|---|---|---|
| metadata syntax | N | N + 1 | N + 1 update value |
| tone_mapping_flag | 1 | 1 | 1 |
| knee_point_x [0] | 150 | 300 | 225 |
| knee_point_y [0] | 1000 | 1200 | 1100 |
| num_bezier_curve_anchors [0] | 9 | 9 | 9 |
| bezier_curve_anchors[0][0] | 500 | 700 | 600 |
| bezier_curve_anchors[0][1] | 700 | 700 | 700 |
| bezier_curve_anchors[0][2] | 800 | 900 | 850 |
| bezier_curve_anchors[0][3] | 850 | 1000 | 925 |
| bezier_curve_anchors[0][4] | 850 | 1000 | 925 |
| bezier_curve_anchors[0][5] | 900 | 1200 | 1050 |
| bezier_curve_anchors[0][6] | 950 | 1200 | 1075 |
| bezier_curve_anchors[0][7] | 980 | 1300 | 1140 |
| bezier_curve_anchors[0][8] | 1200 | 1400 | 1300 |

For example, Table 1 may indicate dynamic tone metadata represented by SMPTE (society of motion picture and television engineers) or ST 2094-40 syntax.

In various embodiments, if the difference in dynamic tone metadata between adjacent images is less than or equal to the second threshold (e.g., "no"-branch of operation 1305), at operation 1309, the electronic device (e.g., processor 120 or 210) may maintain dynamic tone metadata of the adjacent images. In one embodiment, when the difference in dynamic tone metadata between adjacent images is less than or equal to the second threshold, the processor 210 may determine that tone mappings of the adjacent images are similar Hence, the processor 210 may determine to maintain the dynamic tone metadata of the adjacent images.

Figure 15A:
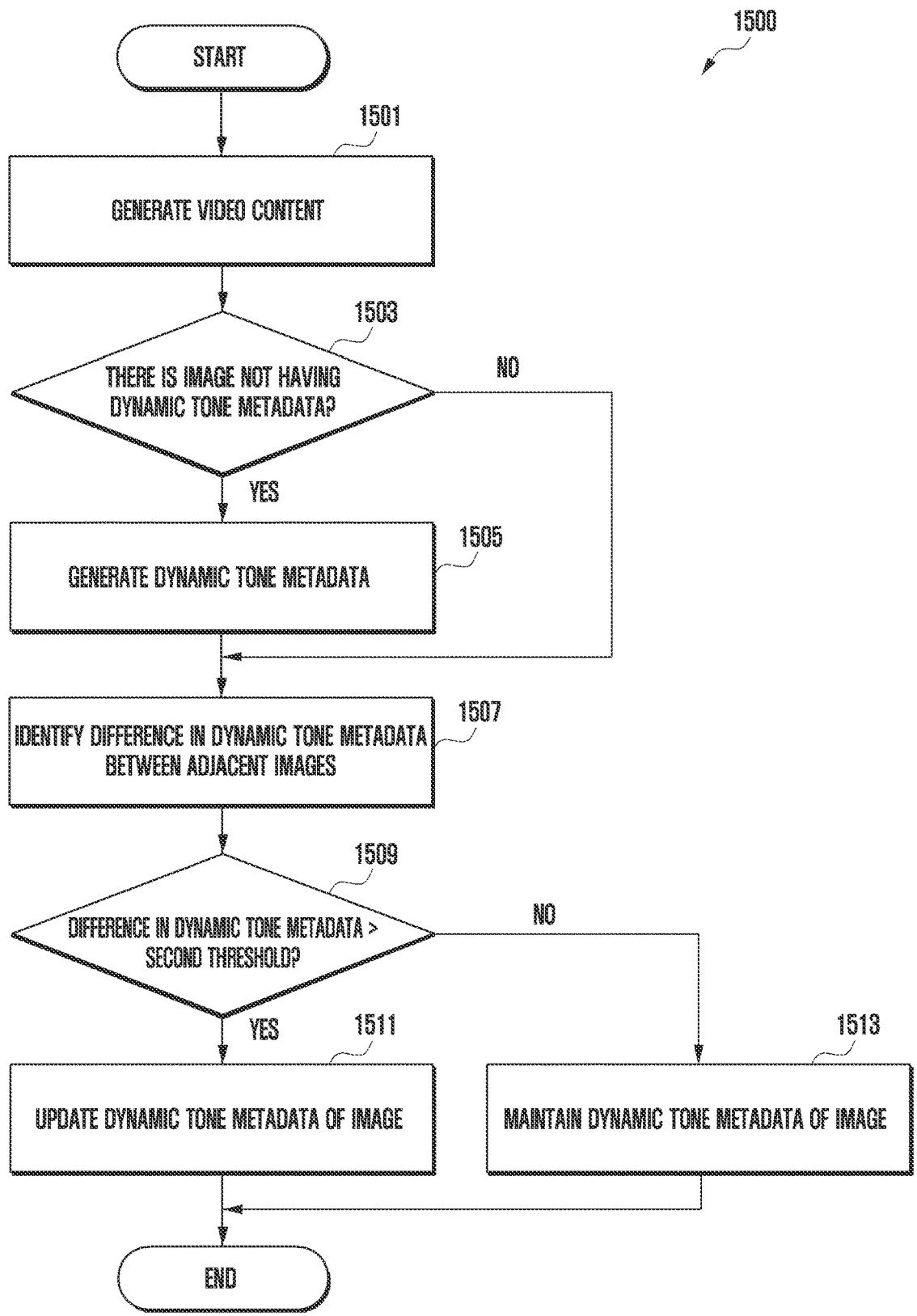
FIG. 15A is a flowchart for an electronic device to generate and edit dynamic tone metadata of video content to which a video concatenation technique is applied according to an embodiment of the disclosure.

FIG. 15A is a flowchart for an electronic device to generate and edit dynamic tone metadata of video content to which a video concatenation technique is applied according to an embodiment of the disclosure.

In the following embodiments, operations may be performed in sequence but are not necessarily performed in sequence. For example, operations may be performed differently from the listed order, and at least two operations may be performed in parallel. For instance, the electronic device may be the electronic device 101 in FIG. 1 or the electronic device 201 in FIG. 2. In the following description, at least some operations of flowchart 1500 of FIG. 15A will be described with reference to FIG. 16.

Figure 16:
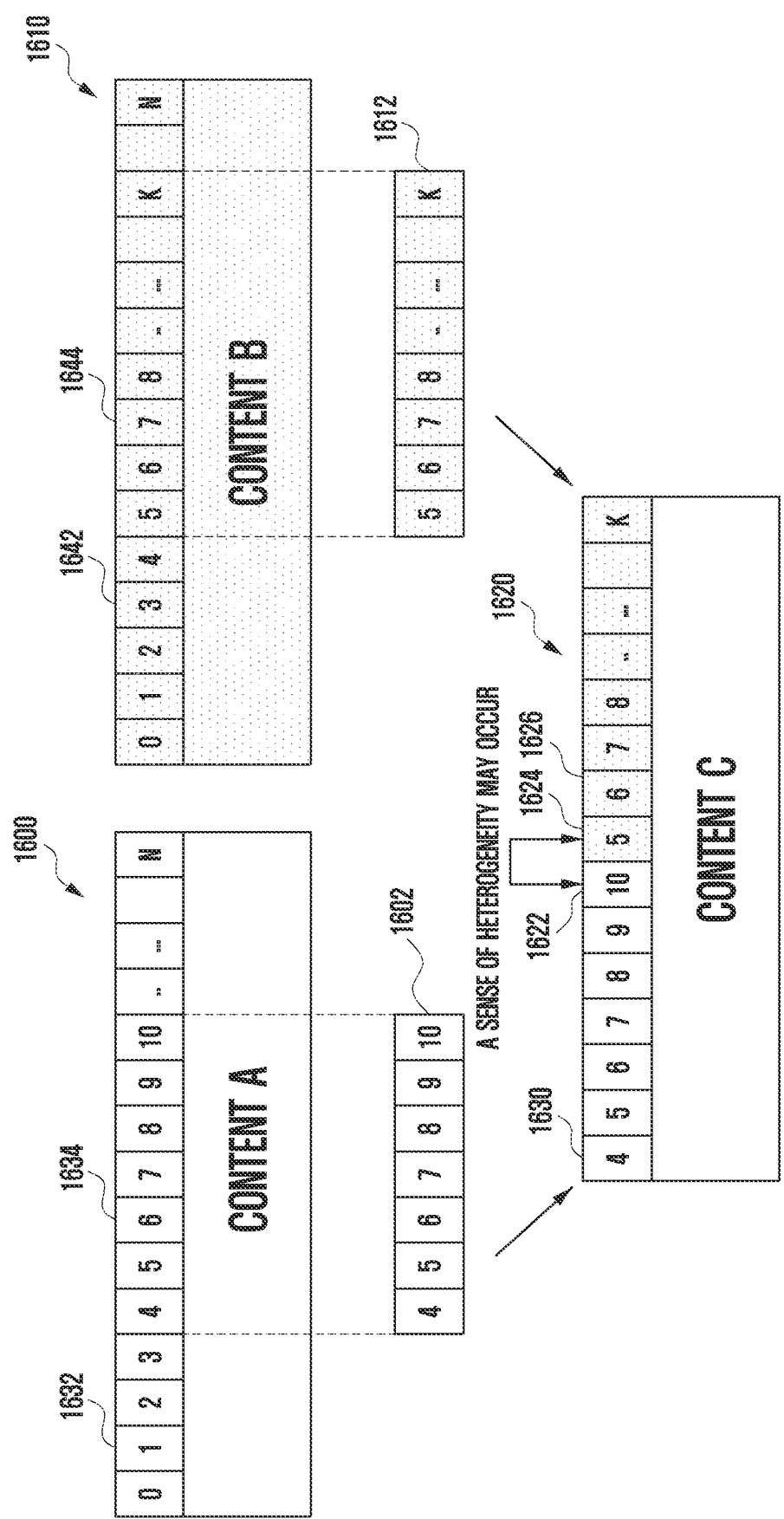
FIG. 16 is a configuration for generating video content through a video concatenation technique in an electronic device according to an embodiment of the disclosure.

FIG. 16 is a configuration for generating video content through a video concatenation technique in an electronic device according to an embodiment of the disclosure.

Referring to FIG. 15A, in various embodiments, at operation 1501, the electronic device (e.g., processor 120 in FIG. 1 or processor 210 in FIG. 2) may generate video content including some portions of a plurality of video content by using a video concatenation technique. In one embodiment, through video concatenation editing as shown in FIG. 16, the processor 210 may generate separate content C (1620) including at least a portion 1602 of content A (1600) and at least a portion 1612 of content B (1610).

In various embodiments, at operation 1503, the electronic device (e.g., processor 120 or 210) may check whether an image not having dynamic tone metadata is present among a plurality of images included in the video content generated based on the video concatenation technique. In one embodiment, in FIG. 16, the processor 210 may determine that image 4 (1630) extracted from content A and/or image 5 (1624) extracted from content B, which are included in content C (1620) generated based on the video concatenation technique, do not have dynamic tone metadata.

In various embodiments, if there is at least one image not having dynamic tone metadata in the video content generated based on the video concatenation technique (e.g., "yes"-branch of operation 1503), at operation 1505, the electronic device (e.g., processor 120 or 210) may generate a dynamic tone metadata for the at least one image not having dynamic tone metadata in the video content generated based on the video concatenation technique. In one embodiment, the processor 210 may generate dynamic tone metadata for the at least one image based on dynamic tone metadata of another image that precedes the at least one image in playback time and is closest to it in the original video content. For example, in FIG. 16, when image 4 (1630) included in content C (1620) does not have dynamic tone metadata, the processor 210 may check content A (1600) being the original video content of image 4 (1630). The processor 210 may identify image 1 (1632) closest to image 4 (1630) in playback time among at least one other image (e.g., image 0 and/or image 1 (1632)) that precedes image 4 (1630) in playback time and has dynamic tone metadata in content A (1600). The processor 210 may generate dynamic tone metadata of image 4 (1630) belonging to content C (1620) by copying dynamic tone metadata of image 1 (1632) belonging to content A (1600). As another example, in FIG. 16, when image 5 (1624) included in content C (1620) does not have dynamic tone metadata, the processor 210 may check content B (1610) being the original video content of image 5 (1624). The processor 210 may identify image 3 (1642) closest to image 5 (1624) in playback time among at least one other image (e.g., image 1 and/or image 3 (1642)) that precedes image 5 (1624) in playback time and has dynamic tone metadata in content B (1610). The processor 210 may generate dynamic tone metadata of image 5 (1624) belonging to content C (1620) by copying dynamic tone metadata of image 3 (1642) belonging to content B (1610). For instance, the original video content may indicate video content to which an image belonging to video content generated based on a video concatenation technique has belonged before application of the video concatenation technique.

In one embodiment, the processor 210 may generate dynamic tone metadata for at least one image based on dynamic tone metadata of another image closest to it in playback time in the original video content. For example, the processor 210 may identify image 6 (1634) closest to image 4 (1630) in playback time among at least one other image (e.g., image 0, image 1 (1632) and/or image 6 (1634)) that has dynamic tone metadata in content A (1600). The processor 210 may generate dynamic tone metadata of image 4 (1630) included in content C (1620) by copying dynamic tone metadata of image 6 (1634) belonging to content A (1600). As another example, the processor 210 may identify image 3 (1642) closest to image 5 (1624) in playback time among at least one other image (e.g., image 1, image 3 (1642) and/or image 7 (1644)) that has dynamic tone metadata in content B (1610). The processor 210 may generate dynamic tone metadata of image 5 (1624) belonging to content C (1620) by copying dynamic tone metadata of image 3 (1642) belonging to content B (1610).

In various embodiments, if there is no image not having dynamic tone metadata in the video content generated based on the video concatenation technique (e.g., "no"-branch of operation 1503) or dynamic tone metadata is generated for the image not having dynamic tone metadata (e.g., operation 1505), at operation 1507, the electronic device (e.g., processor 120 or 210) may check the difference in dynamic tone metadata between the plurality of images belonging to the video content generated based on the video concatenation technique. In one embodiment, in FIG. 16, the processor 210 may identify the difference in dynamic tone metadata between image 10 (1622) of content A (1600) and image 5 (1624) of content B (1610) adjacent to each other at a boundary time point in content C (1620). For example, the difference in dynamic tone metadata is a difference between syntax values defined in the dynamic tone metadata, and may include a difference between tone mapping curves representing the tones (or brightness) of the corresponding images.

In various embodiments, at operation 1509, the electronic device (e.g., processor 120 or 210) may determine whether the difference in dynamic tone metadata between the adjacent images exceeds the second threshold. For instance, the second threshold is a reference value for determining whether pieces of dynamic tone metadata are similar, and may be set differently for each syntax included in the dynamic tone metadata or may be set to correspond to the sum of differences in syntax included in the dynamic tone metadata.

In various embodiments, if the difference in dynamic tone metadata between the adjacent images exceeds the second threshold (e.g., "yes"-branch of operation 1509), at operation 1511, the electronic device (e.g., processor 120 or 210) may update dynamic tone metadata of at least one of the adjacent images. In one embodiment, in FIG. 16, if the difference in dynamic tone metadata between image 10 (1622) of content A (1600) and image 5 (1624) of content B (1610) exceeds the second threshold, the processor 210 may update the dynamic tone metadata of image 5 (1624) belonging to content C (1620). For example, the processor 210 may update the dynamic tone metadata of image 5 (1624) included in content C (1620) based on dynamic tone metadata of at least one of image 5 (1624), image 10 (1622) adjacent to image 5 (1624), or image 6 (1626) adjacent to image 5 (1624), which belongs to content C (1620). For instance, the updated dynamic tone metadata may include an average of dynamic tone metadata of reference images or a sum of dynamic tone metadata of reference images to which a weight is applied.

In various embodiments, if the difference in dynamic tone metadata between the adjacent images does not exceed the second threshold (e.g., "no"-branch of operation 1509), at operation 1513, the electronic device (e.g., processor 120 or 210) may maintain the dynamic tone metadata of the adjacent images.

In various embodiments, the electronic device (e.g., processor 120 or 210) may generate dynamic tone metadata for at least some of the images that do not have dynamic tone metadata in the video content generated based on video concatenation editing. For instance, the at least some images may include an image corresponding to the start position of each original video content within the video content generated based on the video concatenation editing.

In one embodiment, as shown in FIG. 16, when content C (1620) generated based on video concatenation editing includes an image that does not have dynamic tone metadata, the processor 210 may determine whether the image not having dynamic tone metadata is the start image of the original video content within content C (1620). For example, in FIG. 16, the start image of the original video content may include image 4 (1630) with the earliest playback time among at least a portion 1602 of content A (1600) included in content C (1620) and/or image 5 (1624) with the earliest playback time among at least a portion 1612 of content B (1610) included in content C (1620).

In various embodiments, when the image that does not have dynamic tone metadata in content C (1620) in FIG. 16 is the start image of the original video content, the processor 210 may generate dynamic tone metadata of the corresponding image. For example, in FIG. 16, if there is no dynamic tone metadata for image 4 (1630) of content C (1620) extracted from content A (1600), the processor 210 may generate dynamic tone metadata of image 4 (1630) included in content C (1620) based on dynamic tone metadata of another image having dynamic tone metadata in content A (1600). For instance, the dynamic tone metadata of image 4 (1630) included in content C (1620) may be generated based on dynamic tone metadata of the image closest to image 4 (1630) in playback time among other images that precede image 4 (1630) in playback time and have dynamic tone metadata in content A (1600) (e.g., original video content), or based on dynamic tone metadata of the image closest to image 4 (1630) among other images having dynamic tone metadata in content A (1600).

In one embodiment, in FIG. 16, if the image not having dynamic tone metadata in content C (1620) is not the start image of the original video content, the processor 210 may restrict generation of dynamic tone metadata for the corresponding image. For example, when dynamic tone metadata of image 6 of content C (1620) of FIG. 16 extracted from content A (1600) does not exist, the processor 210 may restrict generation of dynamic tone metadata for image 6 included in content C (1620). For instance, at the time when content C (1620) is encoded, the dynamic tone metadata of an image preceding image 6 in playback time in content C (1620) (e.g., image 4 (1630) or image 5) may be used as (or copied to) dynamic tone metadata of image 6.

Figure 15B:
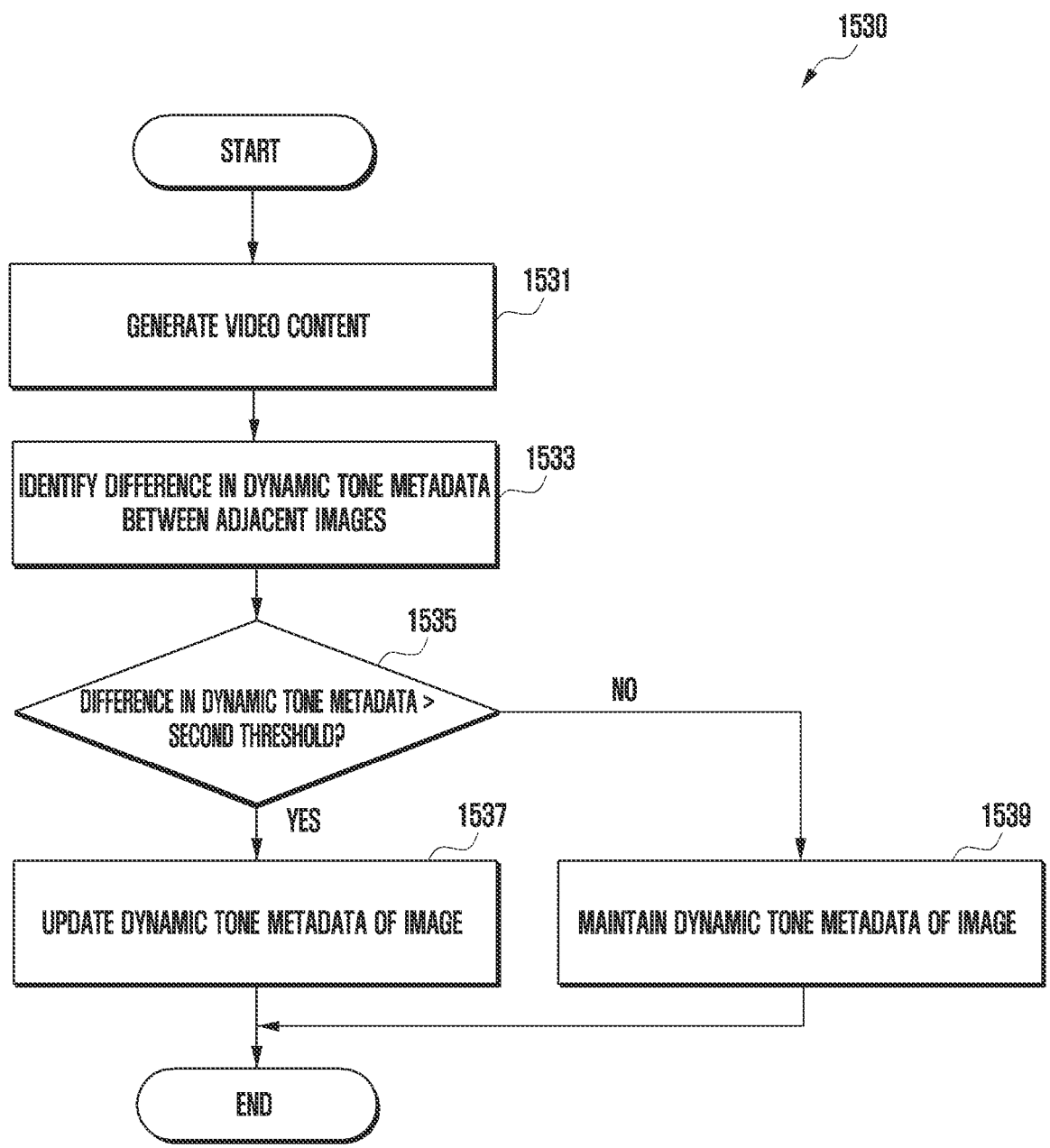
FIG. 15B is a flowchart for an electronic device to edit dynamic tone metadata of video content to which a video concatenation technique is applied according to an embodiment of the disclosure.

FIG. 15B is a flowchart for an electronic device to edit dynamic tone metadata of video content to which a video concatenation technique is applied according to an embodiment of the disclosure.

In the following embodiments, operations may be performed in sequence but are not necessarily performed in sequence. For example, operations may be performed differently from the listed order, and at least two operations may be performed in parallel. For instance, the electronic device may be the electronic device 101 in FIG. 1 or the electronic device 201 in FIG. 2. In the following description, at least some operations of flowchart 1530 of FIG. 15B will be described with reference to FIG. 16.

Referring to FIG. 15B, in various embodiments, at operation 1531, the electronic device (e.g., processor 120 in FIG. 1 or processor 210 in FIG. 2) may generate separate video content by extracting some portions of the plurality of video content according to a video concatenation technique. In one embodiment, as shown in FIG. 16, the processor 210 may generate content C (1620) by extracting at least a portion 1602 of content A (1600) and at least a portion 1612 of content B (1610).

In various embodiments, at operation 1533, the electronic device (e.g., processor 120 or 210) may check the difference in dynamic tone metadata between the plurality of images included in the separate video content generated based on the video concatenation technique. In one embodiment, in FIG. 16, the processor 210 may identify the difference in dynamic tone metadata between image 10 (1622) of content A (1600) and image 5 (1624) of content B (1610) adjacent to each other at a boundary time point in content C (1620).

In various embodiments, at operation 1535, the electronic device (e.g., processor 120 or 210) may determine whether the difference in dynamic tone metadata between the images adjacent in playback time within the separate video content exceeds the second threshold. For instance, the second threshold is a reference value for determining whether pieces of dynamic tone metadata are similar, and may be set differently for each syntax included in the dynamic tone metadata or may be set to correspond to the sum of differences in syntax included in the dynamic tone metadata.

In various embodiments, if the difference in dynamic tone metadata between the images adjacent in playback time exceeds the second threshold (e.g., "yes"-branch of operation 1535), at operation 1537, the electronic device (e.g., processor 120 or 210) may update dynamic tone metadata of at least one of the adjacent images. In one embodiment, in FIG. 16, if the difference in dynamic tone metadata between image 10 (1622) extracted from content A (1600) and image 5 (1624) extracted from content B (1610) exceeds the second threshold, the processor 210 may update the dynamic tone metadata of image 5 (1624) belonging to content C (1620). For example, the processor 210 may update the dynamic tone metadata of image 5 (1624) based on dynamic tone metadata of at least one of image 5 (1624), image 10 (1622) adjacent to image 5 (1624), or image 6 (1626) adjacent to image 5 (1624), which belongs to content C (1620). For instance, the dynamic tone metadata of image 5 (1624) may be updated based on an average of dynamic tone metadata of reference images (e.g., image 10 (1622), image 5 (1624), and/or image 6 (1626)) or a sum of dynamic tone metadata of reference images to which a weight is applied.

In various embodiments, if the difference in dynamic tone metadata between the images adjacent in playback time does not exceed the second threshold (e.g., "no"-branch of operation 1535), at operation 1539, the electronic device (e.g., processor 120 or 210) may maintain the dynamic tone metadata of the images belonging to the video content generated based on the video concatenation technique.

In various embodiments, for content C (1620) generated by a video concatenation editing technique as shown in FIG. 16, the electronic device (e.g., processor 120 or 210) may set a weight for updating dynamic tone metadata based on a sequence or group of pictures (GOP) constituting content C (1620). In one embodiment, the processor 210 may update the dynamic tone metadata of image 5 (1624) extracted from content B (1610) by applying a weight to dynamic tone metadata of image 10 (1622) extracted from content A (1600), image 5 (1624) extracted from content B (1610), and image 6 (1626) extracted from content B (1610), which are consecutive in content C (1620) in FIG. 16. For instance, a relatively large weighting coefficient may be set to the dynamic tone metadata of image 5 (1624) and image 6 (1626) extracted from content B (1610) in comparison to the dynamic tone metadata of image 10 (1622) extracted from content A (1600).

In various embodiments, the electronic device (e.g., processor 120 or 210) may continuously update dynamic tone metadata of images based on the difference in dynamic tone metadata between images belonging to the edited video content. In one embodiment, in FIG. 16, the processor 210 may continuously update dynamic tone metadata of not only the image at boundary time point (e.g., image 10 (1622) of content A (1600) or image 5 (1624) of content B (1610)) but also another image extracted from content B (1610) (e.g., image 6 (1626) of content B (1610)).

In various embodiments, the electronic device (e.g., processor 120 or 210) may update dynamic tone metadata of an image belonging to video content (or edited video content) based on predefined dynamic tone metadata. In one embodiment, as shown in FIG. 16, the processor 210 may generate separate content C (1620) by concatenating at least a portion 1602 of video content 1600 and at least a portion 1612 of video content 1610. To reduce the sense of heterogeneity at the boundary time point, the processor 210 may update the dynamic tone metadata of image 10 (1622) extracted from content A (1600) and/or image 5 (1624) extracted from content B (1610) based on predefined dynamic tone metadata. For example, the processor 210 may detect an image matching image 10 (1622) among a plurality of images having dynamic tone metadata stored in the memory (e.g., memory 130 in FIG. 1) and/or the server (e.g., server 108 in FIG. 1). For instance, the dynamic tone metadata of image 10 (1622) may be updated based on the dynamic tone metadata of the image matching image 10 (1622). As another example, the processor 210 may detect an image matching image 5 (1624) among the plurality of images having dynamic tone metadata stored in the memory (e.g., memory 130 in FIG. 1) and/or the server (e.g., server 108 in FIG. 1). For instance, the dynamic tone metadata of image 5 (1624) may be updated based on the dynamic tone metadata of the image matching image 5 (1624). For instance, at least one image having dynamic tone metadata stored in the memory or server may include at least one image generated (or obtained) by the electronic device 201 at a previous point in time and/or at least one image generated by an expert.

Figure 17:
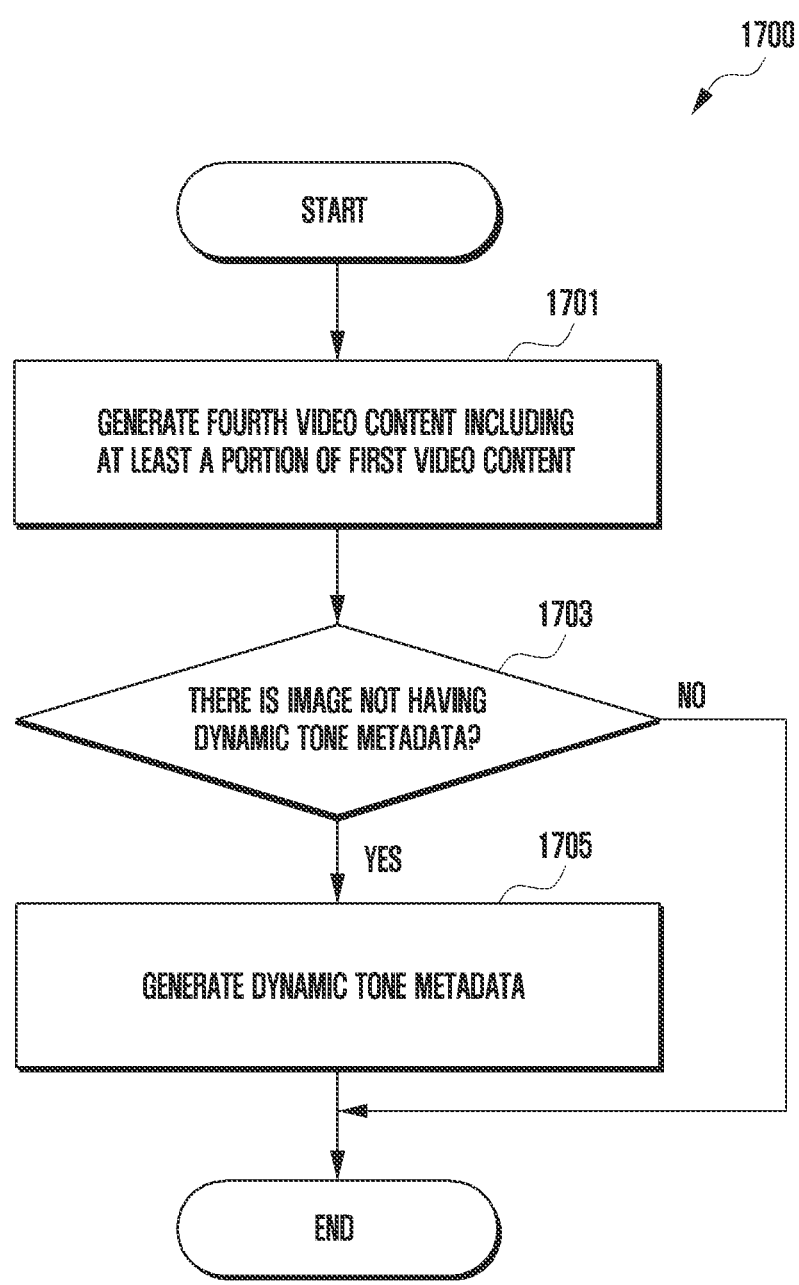
FIG. 17 is a flowchart for an electronic device to edit dynamic tone metadata of video content to which clip editing is applied according to an embodiment of the disclosure.

FIG. 17 is a flowchart for an electronic device to edit dynamic tone metadata of video content to which clip editing is applied according to an embodiment of the disclosure.

In the following embodiments, operations may be performed in sequence but are not necessarily performed in sequence. For example, operations may be performed differently from the listed order, and at least two operations may be performed in parallel. For instance, the electronic device may be the electronic device 101 in FIG. 1 or the electronic device 201 in FIG. 2. In the following description, at least some operations of flowchart 1700 of FIG. 17 will be described with reference to FIG. 18.

Figure 18:
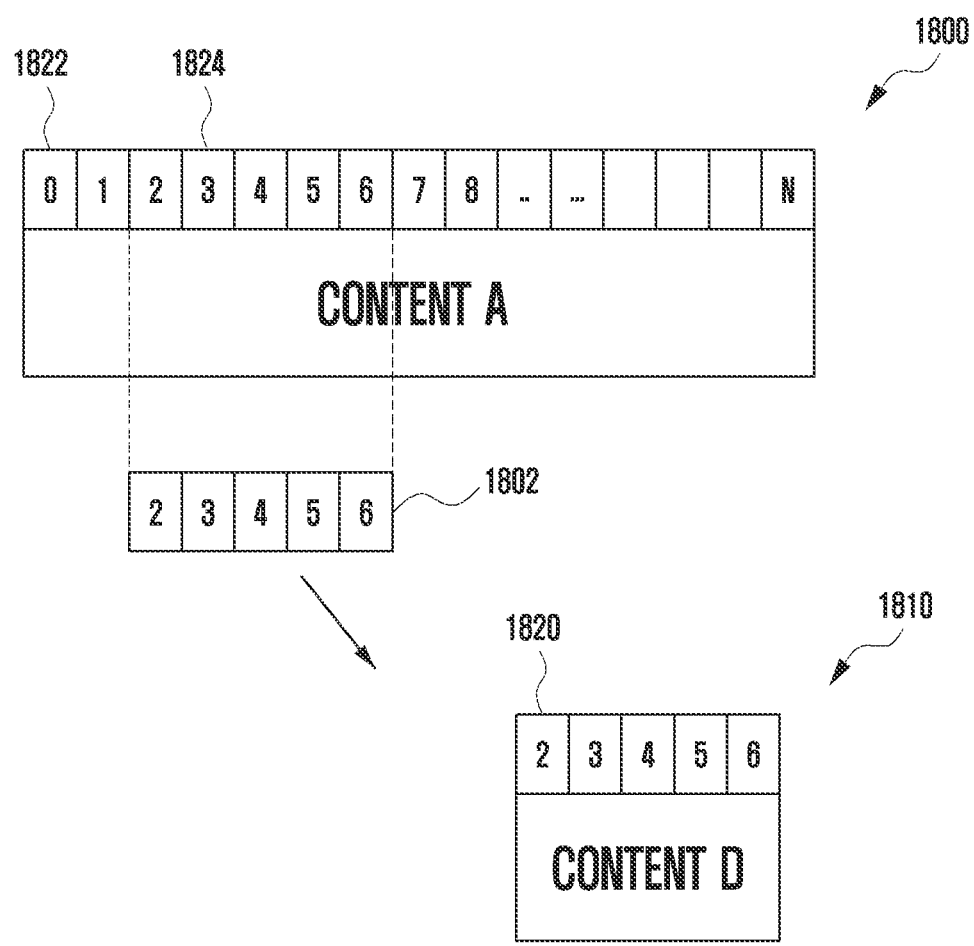
FIG. 18 is a configuration for generating video content through clip editing in an electronic device according to an embodiment of the disclosure.

FIG. 18 is a configuration for generating video content through clip editing in an electronic device according to an embodiment of the disclosure.

Referring to FIG. 17, in various embodiments, at operation 1701, the electronic device (e.g., processor 120 in FIG. 1 or processor 210 in FIG. 2) may generate fourth video content by extracting at least a portion of first video content based on a clip editing technique. In one embodiment, as shown in FIG. 18, the processor 210 may generate content D (1810) including at least a portion 1802 of content A (1800).

In various embodiments, at operation 1703, the electronic device (e.g., processor 120 or 210) may check whether there is an image not having dynamic tone metadata among a plurality of images belonging to the fourth video content generated based on the clip editing technique. In one embodiment, in FIG. 18, the processor 210 may determine that image 2 (1820) does not have dynamic tone metadata in content D (1810).

In various embodiments, if there is at least one image not having dynamic tone metadata (e.g., "yes"-branch of operation 1703), at operation 1705, the electronic device (e.g., processor 120 or 210) may generate dynamic tone metadata for the at least one image not having dynamic tone metadata. In one embodiment, the processor 210 may generate dynamic tone metadata for the at least one image based on dynamic tone metadata of another image that precedes it in playback time and is closest to it in the original video content. For example, in FIG. 18, the processor 210 may identify image 0 (1822) closest to image 2 (1820) in playback time among at least one other image that precedes image 2 (1820) in playback time and has dynamic tone metadata in content A (1800) being the original video content of content D (1810) including image 2 (1820). The processor 210 may generate dynamic tone metadata of image 2 (1820) by copying dynamic tone metadata of image 0 (1822) belonging to content A (1800). In one embodiment, the processor 210 may generate dynamic tone metadata for the at least one image based on dynamic tone metadata of another image closest to it in playback time in the original video content. For example, in FIG. 18, the processor 210 may identify image 3 (1824) closest to image 2 (1820) in playback time among at least one other image having dynamic tone metadata in content A (1800) (e.g., image 0 (1822) and/or image 3 (1824)). The processor 210 may generate dynamic tone metadata of image 2 (1820) by copying dynamic tone metadata of image 3 (1824) belonging to content A (1800).

In various embodiments, if there is no image not having dynamic tone metadata (e.g., "no"-branch of operation 1703), the electronic device (e.g., processor 120 or 210) may store the fourth video content generated based on the clip editing technique. For instance, the fourth video content may be stored in the memory (e.g., memory 130 in FIG. 1) of the electronic device 201 or the server (e.g., server 108 in FIG. 1).

In various embodiments, the electronic device (e.g., processor 120 or 210) may generate dynamic tone metadata for at least some of those images not having dynamic tone metadata in the video content generated based on clip editing. For instance, the at least some images may include an image corresponding to the start position of the original video content within the video content generated based on clip editing.

In one embodiment, when content D (1810) generated based on clip editing includes an image not having dynamic tone metadata as shown in FIG. 18, the processor 210 may determine whether the image not having dynamic tone metadata is the start image of the original video content (e.g., content A (1800)). For instance, the start image of the original video content may include image 2 (1820) with the earliest playback time among at least a portion 1802 of content A (1800) included in content D (1810) in FIG. 18.

In one embodiment, if the image not having dynamic tone metadata in content D (1810) in FIG. 18 is the start image of the original video content, the processor 210 may generate dynamic tone metadata of the corresponding image. For example, if there is no dynamic tone metadata for image 2 (1820) included in content D (1810) in FIG. 18, the processor 210 may generate dynamic tone metadata of image 2 (1820) based on dynamic tone metadata of another image having dynamic tone metadata in content A (1800). For instance, the dynamic tone metadata of image 2 (1820) may be generated based on dynamic tone metadata of an image closest to image 2 (1820) among other images that precede image 2 (1820) in playback time in content A (1800)

and have dynamic tone metadata, or dynamic tone metadata of an image closest to image 2 (1820) among other images that have dynamic tone metadata in content A (1800).

In one embodiment, if the image not having dynamic tone metadata in content D (1810) in FIG. 18 is not the start image of the original video content, the processor 210 may restrict generation of dynamic tone metadata for the corresponding image. For example, when dynamic tone metadata of image 4 of content D (1810) in FIG. 18 does not exist, the processor 210 may restrict generation of dynamic tone metadata for image 4. For instance, at the time when content D (1810) is encoded, the dynamic tone metadata of an image preceding image 4 in playback time in content D (1810) (e.g., image 2 (1820) or image 3) may be used as (or copied to) dynamic tone metadata of image 4.

In various embodiments, the electronic device 201 may generate dynamic tone metadata of an image not having dynamic tone metadata based on a plurality of other images in video content generated by applying a video concatenation technique or clip editing technique. In one embodiment, when there are multiple other images having dynamic tone metadata in the original image content, the processor 210 may generate dynamic tone metadata of an image not having dynamic tone metadata based on an average of dynamic tone metadata of the other images. In one embodiment, the processor 210 may generate dynamic tone metadata of an image not having dynamic tone metadata by applying a weight corresponding to the difference in playback time from the image not having dynamic tone metadata to the other images having dynamic tone metadata in the original video content.

Figure 19:
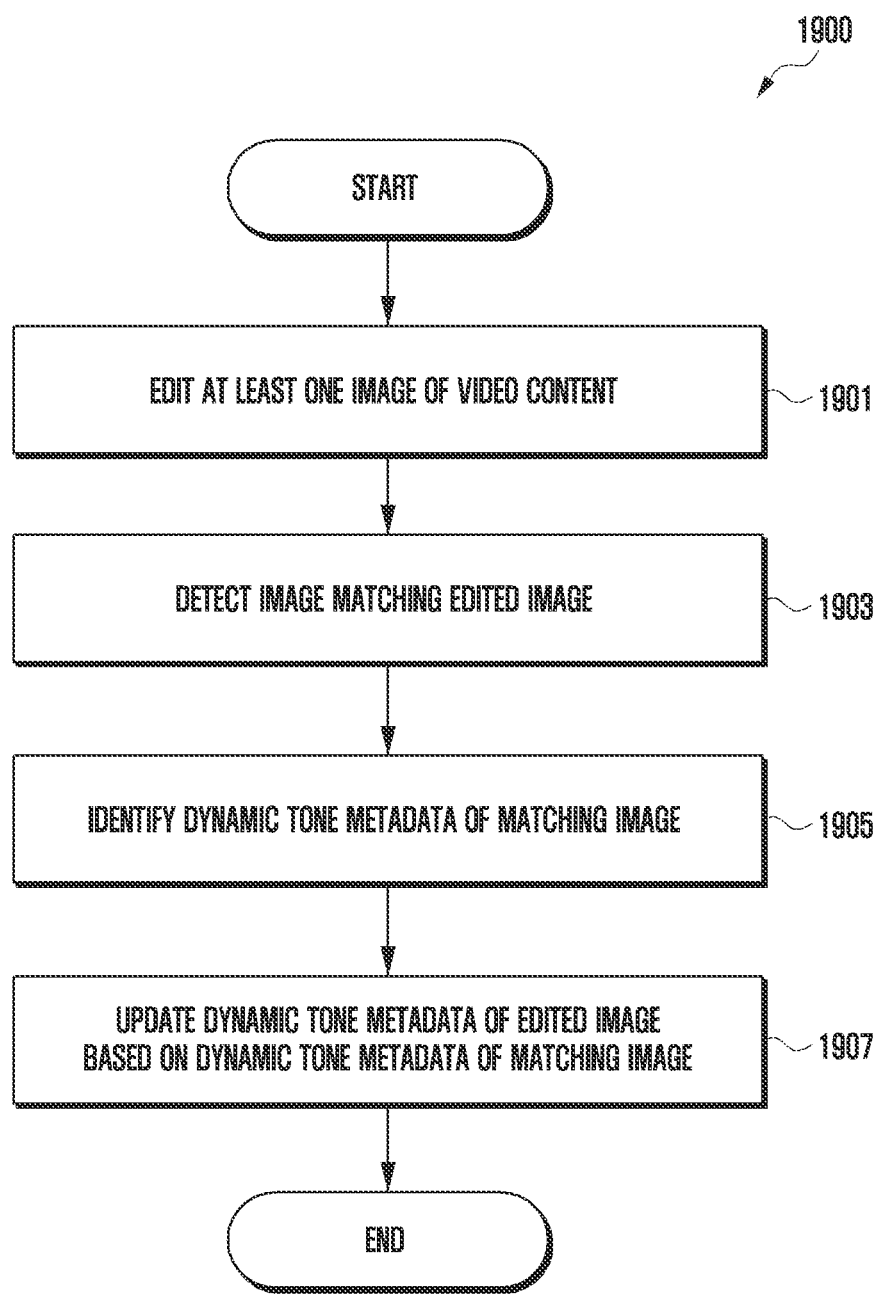
FIG. 19 is a flowchart for an electronic device to update dynamic tone metadata of an edited image according to an embodiment of the disclosure.

FIG. 19 is a flowchart for an electronic device to update dynamic tone metadata of an edited image according to an embodiment of the disclosure.

In the following embodiments, operations may be performed in sequence but are not necessarily performed in sequence. For example, operations may be performed differently from the listed order, and at least two operations may be performed in parallel. For instance, the electronic device may be the electronic device 101 in FIG. 1 or the electronic device 201 in FIG. 2.

Referring to FIG. 19, in various embodiments, at operation 1901 of flowchart 1900, the electronic device (e.g., processor 120 in FIG. 1 or processor 210 in FIG. 2) may edit at least one image belonging to video content based on a video editing technique (e.g., scaling, object insertion, or filtering). In one embodiment, the processor 210 may enlarge or reduce the size of the whole or partial region of at least one image included in the video content based on a scaling editing technique. In one embodiment, the processor 210 may insert graphic or text data into at least a partial region of at least one image included in the video content based on an object insertion editing technique. In one embodiment, the processor 210 may filter the whole or partial region of at least one image included in the video content based on a filtering editing technique.

In various embodiments, at operation 1903, the electronic device (e.g., processor 120 or 210) may detect an image matching the edited image among those images having dynamic tone metadata stored in the memory (e.g., memory 130 in FIG. 1) or a server (e.g., server 108 in FIG. 1). In one embodiment, the processor 210 may select an image having the smallest difference from the edited image, among those images stored in the memory or the server, as an image matching the edited image. For instance, the difference from the edited image may indicate a difference in pixel value or feature point between the edited image and an image stored in the memory or server. For example, the images stored in the memory or the server may include at least one image generated by the electronic device 201 using a camera (e.g., camera module 180 in FIG. 1) and/or at least one image generated by an expert.

In various embodiments, at operation 1905, the electronic device (e.g., processor 120 or 210) may identify the dynamic tone metadata of the image matching the edited image. For instance, the image matching the edited image may indicate an image having a difference from the edited image less than or equal to the first threshold among the images stored in the memory or server.

In various embodiments, at operation 1907, the electronic device (e.g., processor 120 or 210) may generate dynamic tone metadata of the edited image based on dynamic tone metadata of the image matching the edited image. In one embodiment, the processor 210 may update the dynamic tone metadata of the edited image by copying dynamic tone metadata of the image matching the edited image. For instance, the processor 210 may update dynamic tone metadata of all edited images belonging to the video content.

In various embodiments, the electronic device (e.g., processor 120 or 210) may update the dynamic tone metadata of the image edited based on a video editing technique in a manner corresponding to the video editing technique. In one embodiment, when the size of at least one image belonging to the video content is enlarged based on a scaling technique, the processor 210 may update the dynamic tone metadata of the at least one enlarged image so as to correspond to the enlarged image.

Figure 20A:
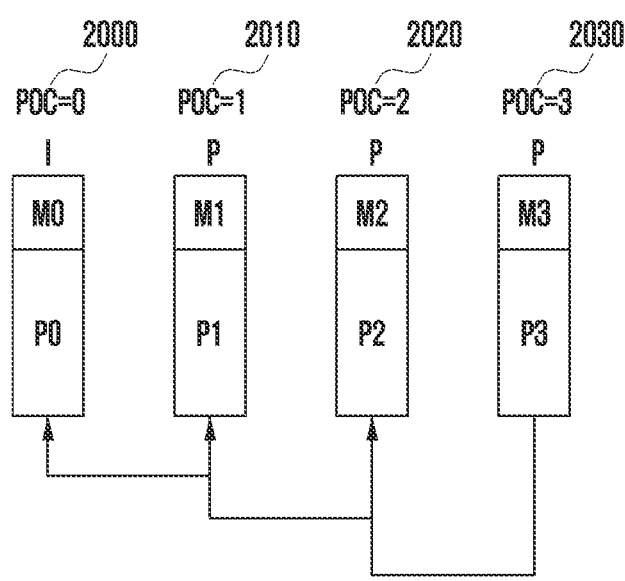
FIGS. 20A to 20C illustrate encoding schemes of video content in an electronic device according to various embodiments of the disclosure.
Figure 20B:
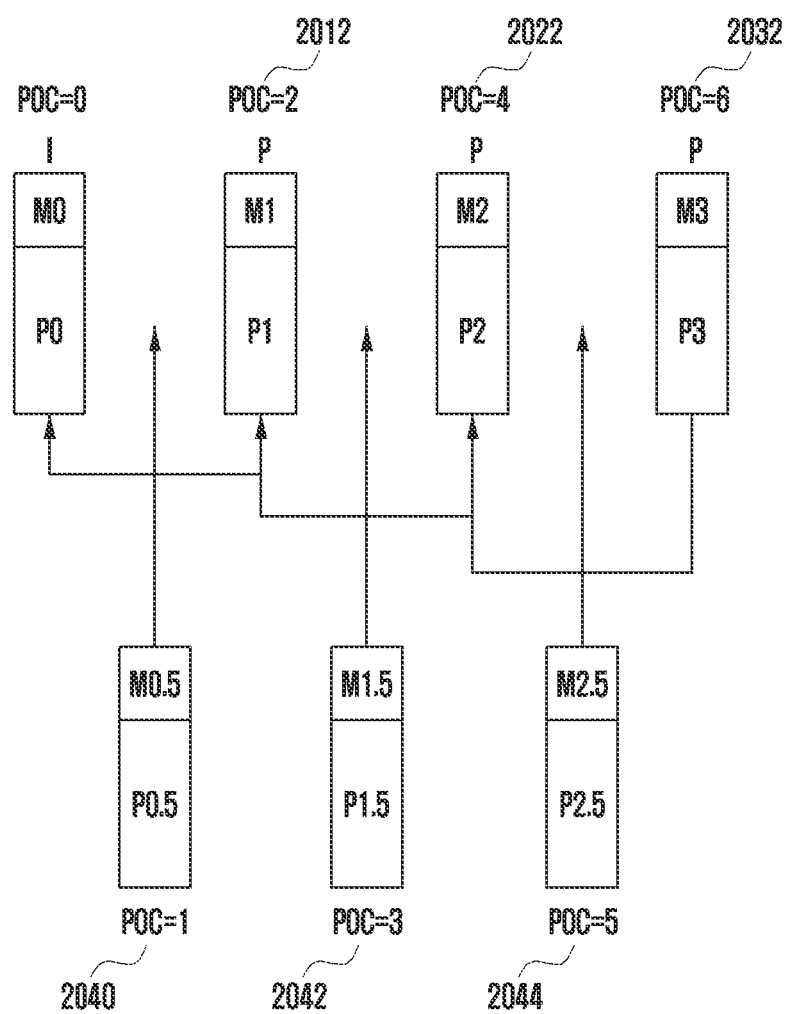
Figure 20C:
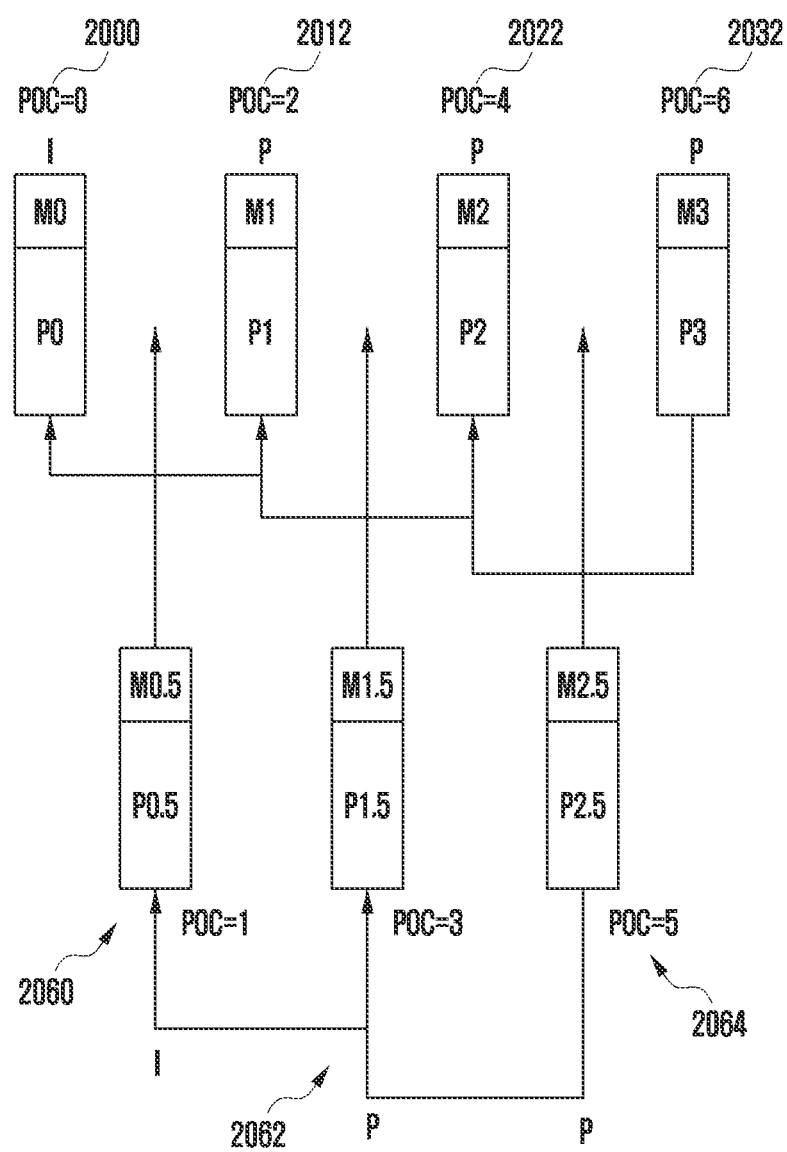

FIGS. 20A to 20C illustrate encoding schemes of video content in an electronic device according to various embodiments of the disclosure.

For instance, the electronic device may be the electronic device 101 in FIG. 1 or the electronic device 201 in FIG. 2.

Referring to FIG. 20A, the bit stream of images having dynamic tone metadata in video content may be configured. For instance, each of individual images 2000 to 2030 may be configured in a form in which dynamic tone metadata M0, M1, M2 or M3 is positioned in front of image data P0, P1, P2 or P3. For example, in the case of HDR 10+, dynamic tone metadata may be included in supplemental enhancement information (SEI). For instance, a picture order count (POC) of each of the images 2000 to 2030 in video content indicates the display order, and may be included in the slice header.

In various embodiments, the electronic device (e.g., processor 120 or 210) may insert at least one additional image into the video content based on an FRC editing technique.

Referring to FIG. 20B, the processor 210 may generate image 0.5 (2040), image 1.5 (2042) and image 2.5 (2044) and insert them into the video content. For example, each additional image 2040, 2042 or 2044 may be configured in a form in which dynamic tone metadata M0.5, M1.5 or M2.5 is located at the front end of image data P0.5, P1.5 or P2.5. In one embodiment, as the additional images 2040, 2042 and 2044 are inserted into the video content with respect to the time axis, the POC of the images 2000 to 2030 set as shown in FIG. 20A may be changed. For example, the POCs of the additional images 2040, 2042 and 2044 may be set respectively to 1, 3 and 5 based on the display order, and the POCs of the original images 2010 to 2030 may be changed respectively to 2, 4 and 6 (2012 to 2032).

In various embodiments, the electronic device (e.g., processor 120 or 210) may encode the additional images 2040, 2042 and 2044 inserted into the video content based on the FRC editing technique by adding them to the bit stream of the original images.

Referring to FIG. 20A, among the original images 2000 to 2030 of the video content, image 0 (2000) may be encoded as an intra picture (e.g., I picture), and image 1 (2010), image 2 (2020) and image 3 (2030) may be encoded as a P picture. For instance, image 3 (2030) may be encoded with reference to image 2 (2020), image 2 (2020) may be encoded with reference to image 1 (2010), and image 1 (2010) may be encoded with reference to image 0 (2000). In one embodiment, the additional images 2040, 2042 and 2044 inserted into the video content may be added to and encoded in the bit stream of the original images 2000, 2010, 2020 and 2030. For example, the additional images 2040, 2042 and 2044 may be encoded as an intra picture. As another example, the additional images 2040, 2042 and 2044 may be encoded as a P picture with reference to image 0 (2000). As another example, the additional images 2040, 2042 and 2044 may be encoded as a P picture with reference to an image preceding in POC.

Referring to FIG. 20C, the electronic device (e.g., processor 120 or 210) may encode the additional images 2040, 2042 and 2044 inserted into the video content based on an FRC editing technique independently of the original images. In one embodiment, among the additional images 2060, 2062 and 2064 of the video content, as shown in FIG. 20C, image 1 (2060) may be encoded as an intra picture (e.g., I picture), and image 3 (2062) and image 5 (2064) may be encoded as a P picture. For instance, image 5 (2064) may be encoded with reference to image 3 (2062), and image 3 (2062) may be encoded with reference to image 1 (2060).

According to various embodiments of the disclosure, when editing video content including dynamic tone metadata (e.g., frame rate up conversion), the electronic device may generate dynamic tone metadata of a new image based on dynamic tone metadata of at least one reference image, so that dynamic tone mapping can be applied while shortening the generation time of dynamic tone metadata of the new image.

According to various embodiments, when editing video content including dynamic tone metadata (e.g., frame rate down conversion or video concatenation), the electronic device may edit dynamic tone metadata of at least one image based on a difference in dynamic tone metadata between adjacent images to thereby reduce a sense of heterogeneity for images with respect to the tone in the video content.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display; and
at least one processor operatively connected to the display,
wherein the at least one processor is configured to:
generate a third image to be inserted between a first image and a second image continuous with the first image among a plurality of images belonging to video content, based on at least one of the first image or the second image,
generate dynamic tone metadata of the third image based on at least one of dynamic tone metadata of the first image or dynamic tone metadata of the second image, and
update the video content by adding the third image and the dynamic tone metadata of the third image,
based on a determination that a difference value between the first image and the second image exceeds a threshold, generate the third image based on the second image, and generate the dynamic tone metadata of the third image based on the dynamic tone metadata of the second image, and
based on a determination that the difference value between the first image and the second image less or equal to the threshold, generate the third image based on the first image and the second image, and generate the dynamic tone metadata of the third image based on the dynamic tone metadata of the first image and the dynamic tone metadata of the second image.

2. The electronic device of claim 1, wherein the at least one processor is further configured to generate the dynamic tone metadata of the third image based on an average of the dynamic tone metadata of the first image and the dynamic tone metadata of the second image.

3. The electronic device of claim 1, wherein the at least one processor is further configured to:
identify a weight corresponding to the first image and the second image based on at least one of a reference ratio of the first image and the second image referenced to generate the third image, a time interval between the first image, the second image, and the third image, a sequence including the first image, the second image, and the third image, or information on a group of pictures (GOP) including the first image, the second image, and the third image, and
generate the dynamic tone metadata of the third image by applying the weight to the dynamic tone metadata of the first image and the dynamic tone metadata of the second image.

4. The electronic device of claim 1, further comprising:
a memory to store a plurality of images having dynamic tone metadata, and
wherein the at least one processor is further configured to:
select an image corresponding to the third image from among the plurality of images stored in the memory or a plurality of images stored in another electronic device, and
set the dynamic tone metadata of the third image to dynamic tone metadata of the selected image corresponding to the third image.

5. The electronic device of claim 1, wherein the at least one processor is further configured to:
edit the generated dynamic tone metadata based on an image being omitted by a framerate down conversion editing technique.

6. An operating method of an electronic device, the method comprising:
based on a determination that a difference value between a first image and a second image exceeds a threshold, generating a third image based on the second image, and generating a dynamic tone metadata of the third image based on a dynamic tone metadata of the second image;
based on a determination that the difference value between the first image and the second image less or equal to the threshold, generating the third image based on the first image and the second image, and generating the dynamic tone metadata of the third image based on a dynamic tone metadata of the first image and the dynamic tone metadata of the second image; and updating video content by adding the third image and the dynamic tone metadata of the third image.

7. The method of claim 6, wherein the generating the dynamic tone metadata of the third image comprises:

based on the determination that the difference value between the first image and the second image less or equal to the threshold, generating the dynamic tone metadata of the third image based on an average of the dynamic tone metadata of the first image and the dynamic tone metadata of the second image.

8. The method of claim 6, wherein the generating the dynamic tone metadata of the third image comprises:

based on the determination that the difference value between the first image and the second image less or equal to the threshold, identifying a weight corresponding to the first image and the second image based on at least one of a reference ratio of the first image and the second image referenced to generate the third image, a time interval between the first image, the second image, and the third image, a sequence including the first image, the second image, and the third image, or information on a group of pictures (GOP) including the first image, the second image, and the third image, and generating the dynamic tone metadata of the third image by applying the weight to the dynamic tone metadata of the first image and the dynamic tone metadata of the second image.

* * * * *